US011819757B2

(12) United States Patent
Nishimura et al.

(10) Patent No.: US 11,819,757 B2
(45) Date of Patent: Nov. 21, 2023

(54) PLURALITY OF GAME MEDIUM SETS FOR EVENTS ACCORDING TO ORGANIZATION RULES

(71) Applicant: CYGAMES, INC., Tokyo (JP)

(72) Inventors: Ryosuke Nishimura, Tokyo (JP); Miho Komatsu, Tokyo (JP)

(73) Assignee: CYGAMES, INC., Tokyo (JP)

( * ) Notice: Subject to any disclaimer, the term of this patent is extended or adjusted under 35 U.S.C. 154(b) by 72 days.

(21) Appl. No.: 17/465,222

(22) Filed: Sep. 2, 2021

(65) Prior Publication Data

US 2021/0394050 A1 Dec. 23, 2021

Related U.S. Application Data

(63) Continuation of application No. PCT/JP2020/009193, filed on Mar. 4, 2020.

(30) Foreign Application Priority Data

Mar. 5, 2019 (JP) ................................ 2019-039526

(51) Int. Cl.
*A63F 13/75* (2014.01)
*A63F 13/822* (2014.01)
*A63F 13/35* (2014.01)

(52) U.S. Cl.
CPC .............. *A63F 13/35* (2014.09); *A63F 13/75* (2014.09); *A63F 13/822* (2014.09)

(58) Field of Classification Search
None
See application file for complete search history.

(56) References Cited

U.S. PATENT DOCUMENTS

2015/0005050 A1* 1/2015 Takayama ............... A63F 13/30
                                                      463/24
2019/0262715 A1 8/2019 Ohashi

FOREIGN PATENT DOCUMENTS

JP    2010-220089 A    9/2010
JP      6469273 B1     2/2019

OTHER PUBLICATIONS

International Search Report issued in International Application No. PCT/JP2020/009193, dated Jun. 9, 2020 (7 pages).

(Continued)

*Primary Examiner* — Damon J Pierce
(74) *Attorney, Agent, or Firm* — Osha Bergman Watanabe & Burton LLP

(57) ABSTRACT

A system according to one or more embodiments of the invention includes a first game medium set organization unit organizing a first game medium set for a first event according to a first organization rule, and a second game medium set organization unit organizing a second game medium set for a second event. The second game medium set organization unit includes: a game medium set application unit applying the first game medium set organized according to the first organization rule to the second game medium set, a determination unit determining whether the second game medium set or the first game medium set to be applied to the second game medium set follows the second organization rule, and a conformance unit conforming, when the determination unit determines that the second organization rule is not followed, to the second organization rule, the second game medium set or the first game medium set.

10 Claims, 14 Drawing Sheets

(56) References Cited

OTHER PUBLICATIONS

Written Opinion issued in International Application No. PCT/JP2020/009193; dated Jun. 9, 2020 (15 pages).
Office Action in counterpart Japanese Patent Application No. 2019-039526 dated Jun. 24, 2019 (14 pages).
About Treasure Map, Treasure Cruise Best Strategy Database, Retrieved from Internet on Oct. 17, 2017; Retrieved from Internet: URL: http://one piece-treasurecruise.com/treasure-map/ (13 pages).
One Piece Treasure Cruise—Part 3: You Can't Put the Same Character in the Sam Room! Let's choose the enemy attack! [Beginner's Guide], OCTOBA, Jun. 10, 2014; Retrieved from Internet on Jun. 6, 2016; Retrieved from Internet: URL: http://octoba.net/archives/20 140610-android-feature-onepiece-3.html (7 pages).
[Treacle] Version (Ver) 8.3 Update Summary [One Piece Cruise], GameWith, Apr. 20, 2018; Retrieved from Internet on Apr. 20, 2018; Retrieved from Internet: URL: https://xn--pck6bvfc.gamewith.jp/article/show/99935 (10 pages).
Studio Bent Staff; "SE-MO-LOK Kingdom Hearts 358/2 Days ULTIMANIA First Edition"; Square Enix Square Enix Hiroshi Taguchi, 1st Edision, pp. 156-157; Jul. 16, 2009 (6 pages).
What is "Law and Chaos", Phantasy Star Saga, Game 8, Aug. 29, 2018; Retrieved from Internet on Jun. 12, 2019; Retrieved from Internet: URL: https://game8.jp/idola/233853 (5 pages).

\* cited by examiner

FIG.2
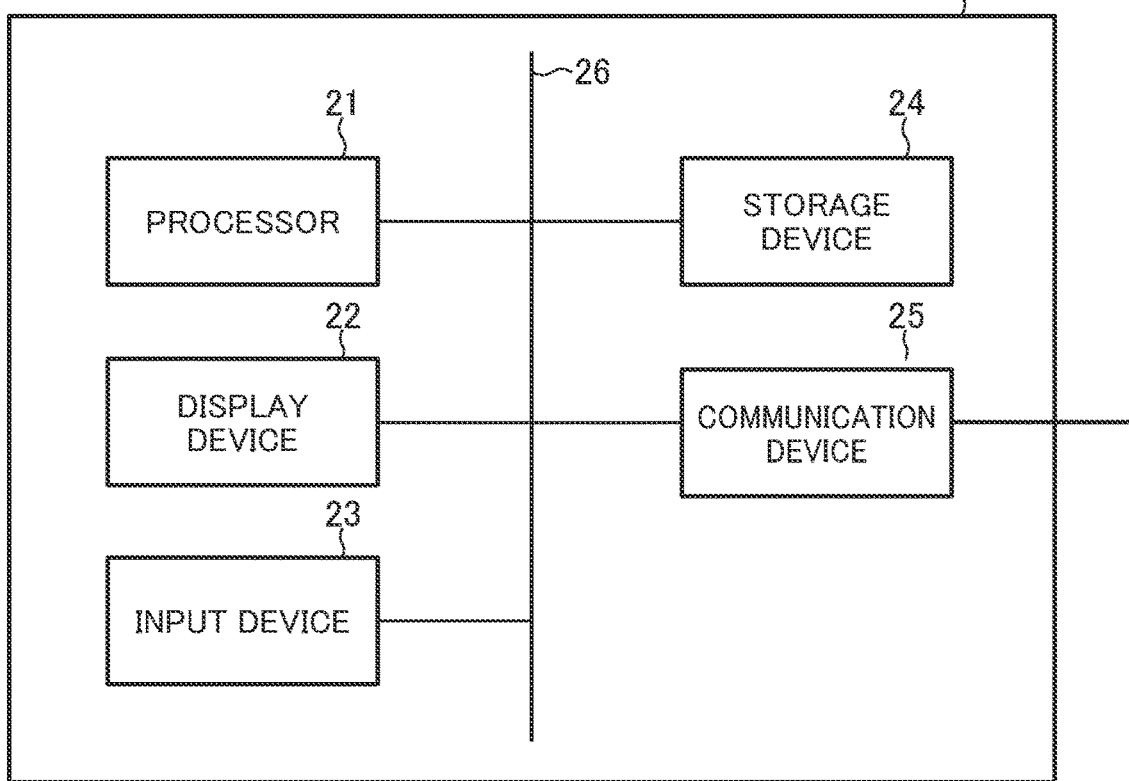
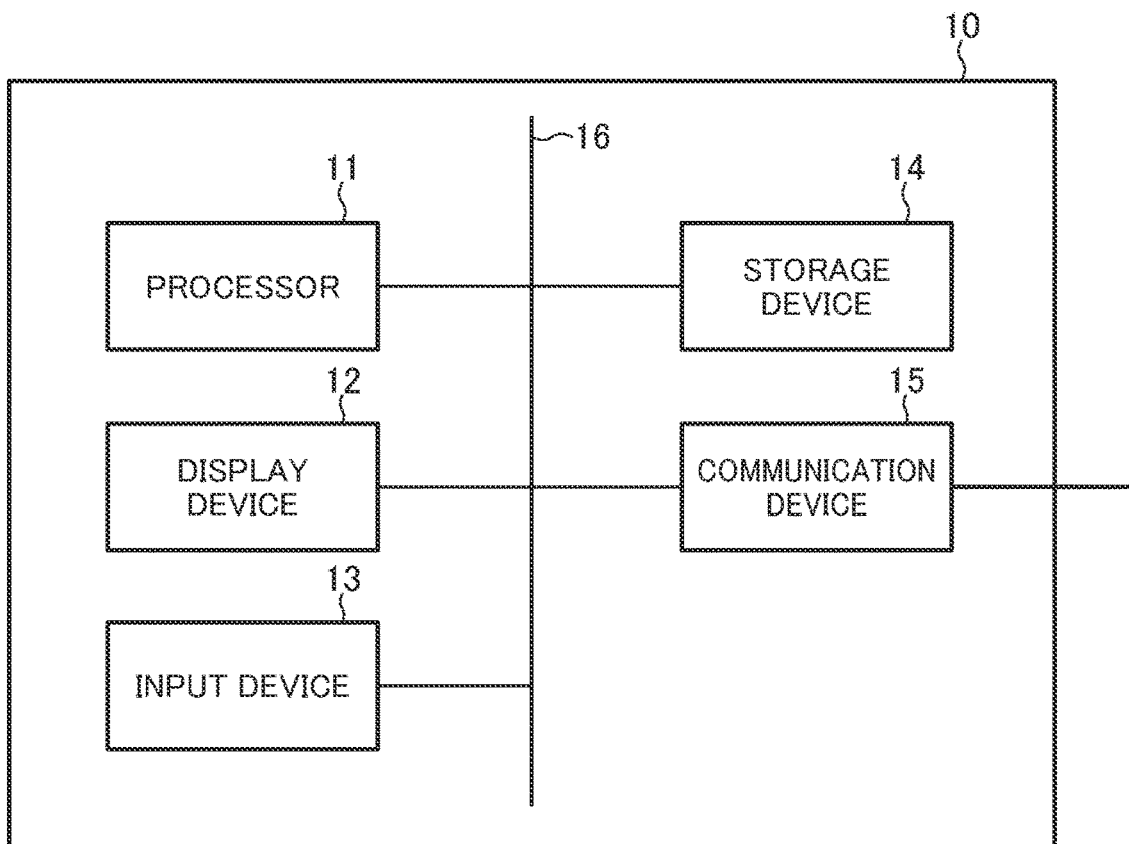

PLURALITY OF GAME MEDIUM SETS FOR EVENTS ACCORDING TO ORGANIZATION RULES

TECHNICAL FIELD

The present invention relates to a program, etc., and particularly relates to a program, etc. for a game that proceeds by using a game medium set organized to include two or more game media selected from among a plurality of game media that can be used by a user.

BACKGROUND ART

Games in which various kinds of events proceed have been released with the recent spread of online games, etc. Among these games, there is a known game in which events proceed by using a game medium set organized to include two or more game media selected from among a plurality of game media, such as cards, that can be used by a user. It is known that player characters and items are set and registered as deck data on the basis of player operations, and the player characters and items are used in the game (Patent Literature 1).

CITATION LIST

Patent Literature

{PTL 1}
Japanese Unexamined Patent Application, Publication No. 2010-220089

SUMMARY OF INVENTION

Technical Problem

There are cases where game medium sets to be used in different events in the same game need to follow different organization rules. Organizing a game medium set is an operation that places a large burden on a user, and particularly, in the case where a device having a limited screen size and input user interface, such as a smartphone, is used, there are cases where the user feels that organizing a game medium set for each event is laborious work. Thus, it is likely that, when starting a new event, a user hesitates to play the new event due to the obstacle that the user needs to organize a game medium set in accordance with a new organization rule, and eventually the user loses interest in the game itself.

The present invention has been made in order to solve the problem described above, and a main object thereof is to provide a program, etc. that makes it possible to reduce the number of inputs by a user and reduce the burden on the user during an operation.

Solution to Problem

In order to achieve the above-described object, a system according to an aspect of the present invention is a system for a game that proceeds with a first event and a second event by using a game medium set organized to include two or more game media selected from among a plurality of game media that can be used by a user, the first event using a game medium set organized in accordance with a first organization rule and the second event using a game medium set organized in accordance with a second organization rule, the system including: a first game medium set organization unit that organizes, on the basis of a user input, a first game medium set for the first event in accordance with the first organization rule; a second game medium set organization unit that organizes, on the basis of a user input, a second game medium set for the second event; wherein the second game medium set organization unit includes a game medium set application unit that applies the first game medium set organized in accordance with the first organization rule to the second game medium set, a determination unit that determines whether the second game medium set or the first game medium set to be applied to the second game medium set follows the second organization rule, and a conformance unit that, in the case where the determination unit determines that the second organization rule is not followed, conforms, to the second organization rule, the second game medium set or the first game medium set to be applied to the second game medium set.

It is possible that the conformance unit generates information for presenting a game medium not following the second organization rule among the game media included in the second game medium set, or removes the game medium not following the second organization rule among the game media included in the second game medium set from the second game medium set.

The first game medium set to be applied to the second organization rule may include a first game medium set selected to be applied to the second organization rule.

The first game medium set organization unit may organize two or more first game medium sets, the second game medium set organization unit may organize two or more second game medium sets, and the game medium set application unit may apply a selected one of the two or more organized first game medium sets to one of the two or more second game medium sets.

It is possible that the second event proceeds by using the two or more second game medium sets, the second game medium set organization unit organizes, in accordance with a user operation, the two or more second game medium sets to be used for the second event to proceed, and the determination unit compares identifiers associated with game media included in one of the second game medium sets with identifiers associated with game media included in the other second game medium sets, and in the case where there are game media having identifiers coinciding with each other, determines that the one of the second game medium sets does not follow the second organization rule.

It is possible that two or more kinds of identifiers are associated with game media, and the determination unit compares identifiers associated with game media included in one of the second game medium sets with identifiers associated with game media included in the other second game medium sets, and in the case where there are game media having any kinds of identifiers coinciding with each other, determines that the one of the second game medium sets does not follow the second organization rule.

The system may include a server and one or more user terminals, the server may include the first game medium set organization unit and the second game medium set organization unit, and each of the user terminals may accept a user input and transmit the accepted user input to the server.

A method according to an embodiment of the present invention is a method for a game that proceeds with a first event and a second event by using a game medium set organized to include two or more game media selected from among a plurality of game media that can be used by a user, the first event using a game medium set organized in accordance with a first organization rule and the second event using a game medium set organized in accordance with a second organization rule, the method including: a first game medium set organization step of organizing, on the basis of a user input, a first game medium set for the first event in accordance with the first organization rule; a second game medium set organization step of organizing, on the basis of a user input, a second game medium set for the second event; wherein the second game medium set organization step includes a game medium set application step of applying the first game medium set organized in accordance with the first organization rule to the second game medium set, a determination step of determining whether the second game medium set or the first game medium set to be applied to the second game medium set follows the second organization rule, and a conformance step of, in the case where it is determined in the determination step that the second organization rule is not followed, conforming, to the second organization rule, the second game medium set or the first game medium set to be applied to the second game medium set.

A program according to an embodiment of the present invention is a program for a game that proceeds with a first event and a second event by using a game medium set organized to include two or more game media selected from among a plurality of game media that can be used by a user, the first event using a game medium set organized in accordance with a first organization rule and the second event using a game medium set organized in accordance with a second organization rule, the program causing one or more computers to execute: a first game medium set organization step of organizing, on the basis of a user input, a first game medium set for the first event in accordance with the first organization rule; and a second game medium set organization step of organizing, on the basis of a user input, a second game medium set for the second event; wherein the second game medium set organization step includes a game medium set application step of applying the first game medium set organized in accordance with the first organization rule to the second game medium set, a determination step of determining whether the second game medium set or the first game medium set to be applied to the second game medium set follows the second organization rule, and a conformance step of, in the case where it is determined in the determination step that the second organization rule is not followed, conforming, to the second organization rule, the second game medium set or the first game medium set to be applied to the second game medium set.

A server according to an embodiment of the present invention is a server for a game that proceeds with a first event and a second event by using a game medium set organized to include two or more game media selected from among a plurality of game media that can be used by a user, the first event using a game medium set organized in accordance with a first organization rule and the second event using a game medium set organized in accordance with a second organization rule, the server including: a first game medium set organization unit that organizes, on the basis of a user input, a first game medium set for the first event in accordance with the first organization rule; and a second game medium set organization unit that organizes, on the basis of a user input, a second game medium set for the second event; wherein the second game medium set organization unit includes a game medium set application unit that applies the first game medium set organized in accordance with the first organization rule to the second game medium set, a determination unit that determines whether the second game medium set or the first game medium set to be applied to the second game medium set follows the second organization rule, and a conformance unit that, in the case where the determination unit determines that the second organization rule is not followed, conforms, to the second organization rule, the second game medium set or the first game medium set to be applied to the second game medium set.

An electronic device according to an embodiment of the present invention is an electronic device for a game that proceeds with a first event and a second event by using a game medium set organized to include two or more game media selected from among a plurality of game media that can be used by a user, the electronic device being used by the user, the first event using a game medium set organized in accordance with a first organization rule and the second event using a game medium set organized in accordance with a second organization rule, the electronic device including: a first game medium set organization unit that organizes, on the basis of a user input, a first game medium set for the first event in accordance with the first organization rule; a second game medium set organization unit that organizes, on the basis of a user input, a second game medium set for the second event; wherein the second game medium set organization unit includes a game medium set application unit that applies the first game medium set organized in accordance with the first organization rule to the second game medium set, a determination unit that determines whether the second game medium set or the first game medium set to be applied to the second game medium set follows the second organization rule, and a conformance unit that, in the case where the determination unit determines that the second organization rule is not followed, conforms, to the second organization rule, the second game medium set or the first game medium set to be applied to the second game medium set.

Advantageous Effects of Invention

The present invention makes it possible to reduce the number of inputs by a user and reduce the burden on the user during an operation.

BRIEF DESCRIPTION OF DRAWINGS

FIG. 2 is a hardware configuration diagram of an electronic device according to the embodiment of the present invention.

DESCRIPTION OF EMBODIMENTS

A game system 1 according to an embodiment of the present invention will be described below with reference to the drawings. In this specification, there are cases where descriptions that are more detailed than necessary are omitted for convenience of description. For example, there are cases where detailed descriptions of matters that are already well known and repeated descriptions of substantially the same configurations are omitted.

Although the game system 1 can be realized by a system in which a plurality of electronic devices are connected with each other via a network, the game system 1 can also be realized by a single electronic device. First, an embodiment using a system connected to a network is described.

Figure 1:
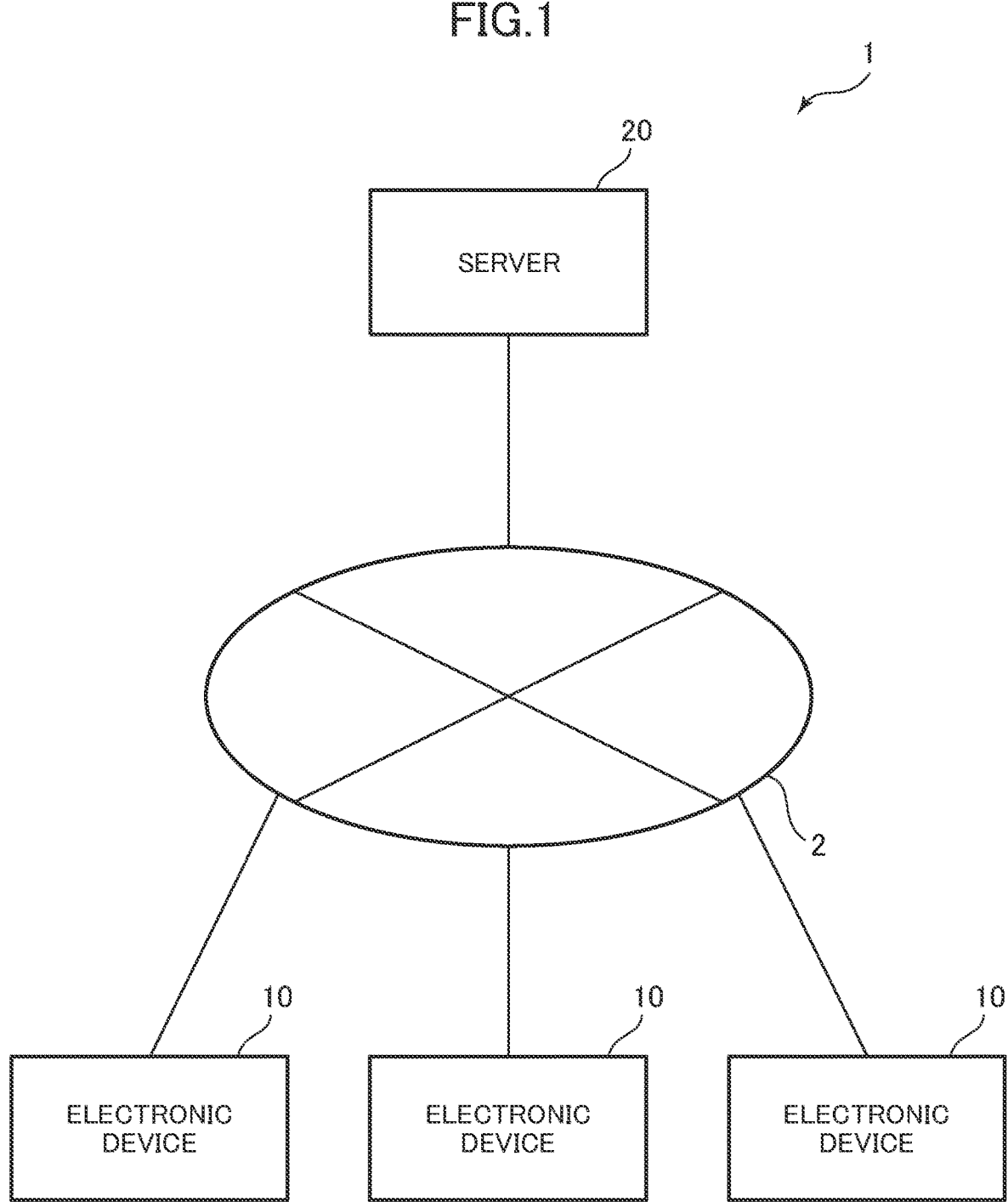
FIG. 1 is a system configuration diagram according to an embodiment of the present invention.

FIG. 1 shows an example of the overall configuration of a game system according to an embodiment of the present invention. As shown in FIG. 1, the game system 1 includes a plurality of electronic devices 10 and a server 20, and the electronic devices 10 and the server 20 are connected to a network 2 such as the Internet and can communicate with each other. Note that the game system 1 in this embodiment is described by assuming a server-client system.

FIG. 2 is a block diagram showing the hardware configurations of the electronic device 10 and the server 20 according to the embodiment of the present invention. The electronic device 10 includes a processor 11, a display device 12, an input device 13, a storage device 14, and a communication device 15. These constituent devices are connected via a bus 16. It is assumed that interfaces are interposed as needed between the bus 16 and the individual constituent devices. In this embodiment, the electronic device 10 is a smartphone. Alternatively, the electronic device 10 may be a terminal such as a computer or a game device equipped with a contact-type input device, like a tablet computer or a touchpad, as long as the terminal includes the configuration described above.

Similarly, the server 20 includes a processor 21, a display device 22, an input device 23, a storage device 24, and a communication device 25. These constituent devices are connected via a bus 26. It is assumed that interfaces are interposed as needed between the bus 26 and the individual constituent devices. In this embodiment, the server 20 is realized by a computer.

The processors 11, 21 control the overall operation of the electronic device 10 and the server 20; for example, the processors 11, 21 are CPUs. Alternatively, an electronic circuit such as an MPU may be used as the processors 11, 21. The processors 11, 21 execute various kinds of processing by loading programs and data stored in the storage device 14, 24 and executing the programs. In one example, each of the processors 11, 21 is constituted of a plurality of processors.

The display devices (display) 12, 22 display application screens, etc. to the user (player) of the electronic device 10 or the user (administrator) of the server 20 under the control of the processors 11, 21. The display devices (display) 12, 22 are preferably liquid crystal displays but may be organic EL displays, plasma displays, or the like.

The input devices 13, 23 are user interfaces for accepting inputs to the electronic device 10 and the server 20 from the user; for example, the input devices 13, 23 are touchscreens, touchpads, keyboards, or mouses. In this embodiment, since the electronic device 10 is a smartphone, the electronic device 10 includes a touchscreen as the input device 13, the touchscreen also functions as the display device 12, and the display device 12 and the input device 13 are constructed in an integrated form. The display device 12 and the input device 13 may be disposed at separate positions in separate forms. Since the server 20 is a computer, it is assumed that the server 20 includes a keyboard and a mouse as the input devices and includes a liquid crystal display as the display device.

The storage devices 14, 24 are storage devices included in ordinary smartphones or computers, including RAMs, which are volatile memories, and ROMs, which are non-volatile memories. The storage devices 14, 24 may also include external memories. For example, the storage device 14 stores a browser program or a game program, and the storage device 24 stores a server game program. The browser program or the game program is started in accordance with a user operation on the electronic device 10, and is executed on an operating system (OS) implemented in the electronic device 10 in advance. The server game program includes functions and various kinds of data for executing information processing such that a game appropriately proceeds in the browser program or the game program executed on each electronic device serving as a client.

In one example, the storage device 14, 24 includes a main storage device and an auxiliary storage device. The main storage device is a volatile storage medium that allows high-speed reading and writing of information and is used as a storage area and a work area when the processor 11, 21 processes information. The auxiliary storage device stores various programs and data that are used by the processor 11, 21 when the individual programs are executed. The auxiliary storage device is, for example, a hard disk device; however, the auxiliary storage device may be any type of non-volatile storage or non-volatile memory that is capable of storing information, and may be of the removable type. For example, the auxiliary storage device stores an operating system (OS), middleware, application programs, various kinds of data that may be referred to when these programs are executed, etc.

The communication devices 15, 25 transmit data to and receive data from other devices via the network 2 (not shown in FIG. 2). For example, the communication devices 15, 25 carry out wireless communication, such as mobile communication or wireless LAN communication, to connect to the network 2. The electronic device 10 carries out communication with the server 20 via the network by using the communication device 15. The communication devices 15, 25 may carry out wired communication using an Ethernet (registered trademark) cable or the like.

Figure 3:
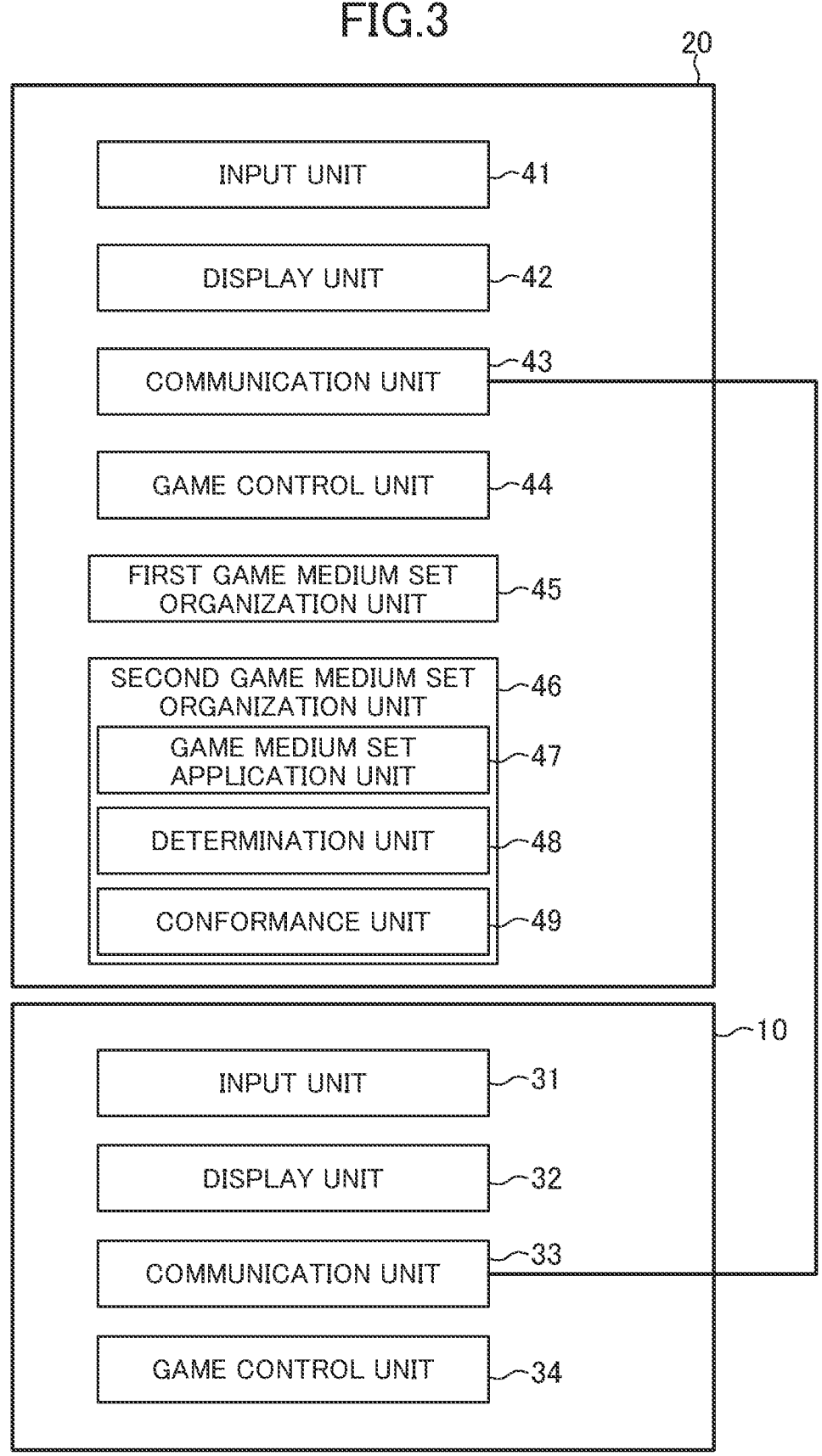
FIG. 3 is a function block diagram of the electronic device according to the embodiment of the present invention.

FIG. 3 shows an example of the functional block diagram of the electronic device 10 and the server 20 according to the embodiment of the present invention. The electronic device 10 includes an input unit 31, a display unit 32, a communication unit 33, and a game control unit 34, and the server 20 includes an input unit 41, a display unit 42, a communication unit 43, and a game control unit 44, a first game medium set organization unit 45, and a second game medium set organization unit 46. The second game medium set organization unit 46 includes a game medium set application unit 47, a determination unit 48, and a conformance unit 49. In this embodiment, these functions are realized by the processors 11 and 21 executing programs. For example, the executed programs are a browser program or a game program stored in the storage device 14, 24. Since various kinds of functions are realized by loading programs, as described above, a portion or the entirety of one part (function) may be provided in another part. These functions may be realized by means of hardware by configuring electronic circuits or the like for realizing the individual functions in part or in entirety.

The input unit 31, 41 is configured by using the input device 13, 23, and accepts inputs to the electronic device 10 and the server 20 from the user. The electronic device 10 and the server 20 accepts user inputs via the input unit 31, 41. In this embodiment, a touch detection function generally provided in a smartphone including a touchscreen can be used in the electronic device 10.

The display unit 32 displays a game screen on the display device 12, and displays a game screen according to the proceedings of the game or user operations. The game control unit 34 performs control processing and stores various kinds of data required for processing when executing a game in this embodiment. In this embodiment, a browser program is used for processing of information input from and output to the user, processing of a signal transmitted to or received from the server 20, etc. In the case where a game is executed by installing a game application on the electronic device 10, the game control unit 34 realized by this operation executes various kinds of information processing for executing the game, such as proceeding with the game or managing data.

The display unit 42 displays an administration screen for a game administrator on the display device 22 as needed. The game control unit 44 executes processing for a game executed by the electronic device 10 in this embodiment. In one example, when a browser is started, the game control unit 34 is realized, and an access to the server 20 is performed for a game to proceed in the electronic device 10, the game control unit 44 transmits and receives data regularly or as needed for the game to proceed. For example, the game control unit 44 performs control processings and stores various kinds of data, etc. required for processing when executing a game in this embodiment, and provides the data, etc. to the electronic device 10, as appropriate. The various kinds of data include information about a first game medium set and a second game medium set.

The first game medium set organization unit 45 and the second game medium set organization unit 46 execute processing for organizing a first game medium set and a second game medium set to be used for a first event and a second event to proceed on the basis of a user input. The first game medium set needs to follow a first organization rule for the first event. The second game medium set needs to follow a second organization rule for the second event. The first and second game medium set organization units 45 and 46 execute processing for organizing the individual game medium sets to follow these rules.

The game medium set application unit 47 included in the second game medium set organization unit 46 executes processing for selecting the first game medium set organized in accordance with the first organization rule in order to apply the first game medium set to the second game medium set, and processing for applying the selected first game medium set to the second game medium set. Here, the application includes various aspects and includes, for example, storing the first game medium set in order to use the first game medium set as the second game medium set. It is possible to assume that storing the first game medium set in order to use the first game medium set as the second game medium set involves, for example, storing game media included in the first game medium set selected by the user, by copying the game media to a storage area for the second game medium set.

The determination unit 48 determines whether the second game medium set or the first game medium set to be applied to the second game medium set follows the second organization rule, i.e., the first game medium set conforms to the second organization rule. The first game medium set to be applied to the second game medium set is, for example, the first game medium set selected to be applied to the second game medium set. In the case where the determination unit 48 determines that the second organization rule is not followed, the conformance unit 49 executes processing for conforming, to the second organization rule, the second game medium set or the first game medium set to be applied to the second game medium set. The conformance processing includes various aspects. In this embodiment, presenting information for indicating a card associated with a non-conforming character, presenting information for giving an instruction to delete the card associated with the non-conforming character, and deleting the non-conforming card from a game medium set in accordance with the user instruction. Furthermore, the card determined as a non-conforming card may be deleted from the game medium set without the user instruction.

Figure 4:
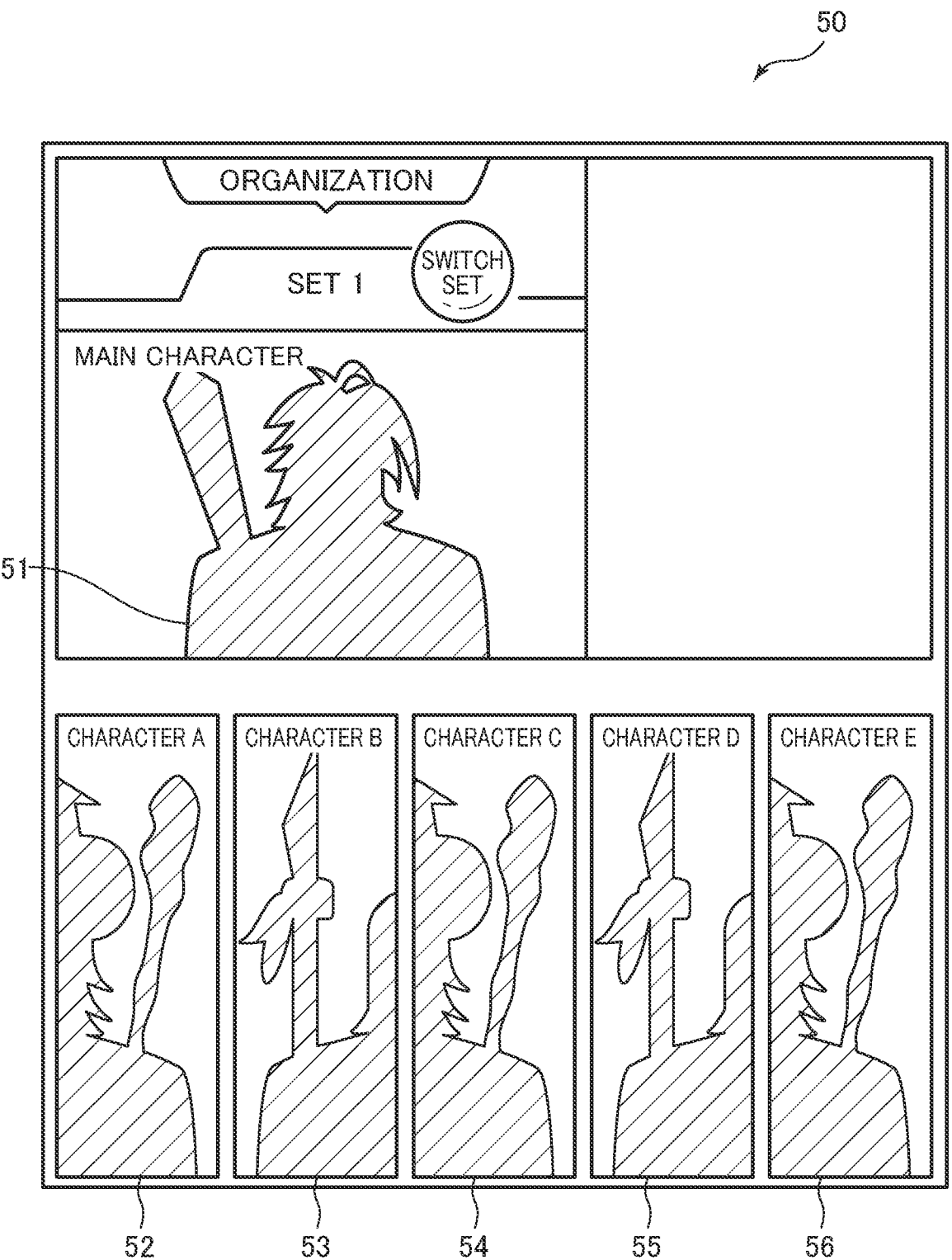
FIG. 4 is an example of a game screen according to the embodiment of the present invention.

FIG. 4 shows an example of a game medium set organization screen 50 used in this embodiment. When the server 20 receives a game medium set organization request from the electronic device 10, the server 20 generates game medium setting screen information and transmits the game medium setting screen information to the electronic device 10. For example, the game medium set organization request is executed in response to a user touching a button, displayed on a game screen, for organizing a game medium set. The electronic device 10 displays, on the basis of this game medium set organization screen information, the game medium set organization screen 50, shown in FIG. 4, on the entire screen of a touchscreen functioning as the input unit 31 and the display unit 32 of the electronic device 10.

In this embodiment, each of the first and second game medium sets is configured to include six cards serving as game media. A character is associated with each card. A card ID and a character ID are assigned to a card and a character, respectively, and, for example, the card ID and the character ID are stored in and managed by the game control unit 44 as a card information table shown in Table 1. Furthermore, it is assumed that a group ID is associated with a card ID.

TABLE 1

| Card ID | Character ID | Group character | Group ID |
|---------|--------------|-----------------|----------|
| 1 | 15 | 0 | 12 |
| 2 | 12 | 0 | 5 |
| 3 | 5 | 0 | 12 |
| 4 | 7 | 0 | — |
| 5 | 15 | 0 | 12 |
| 6 | 23 | 1 | 12 |
| . . . | . . . | | . . . |

A card ID is an identifier unique to each card. A character ID is an identifier unique to each character. There are cases where a plurality of versions are provided for a character. Thus, there are cases where the same character ID is assigned to a plurality of card IDs. It is determined that a plurality of cards to which the same character ID has been assigned are cards associated with the same character, and it is possible to determine that there are different versions of the character because the card IDs are different.

Furthermore, it is possible to provide a single grouped character by using a plurality of characters. In this case, a single character ID and a single group ID are assigned to a group character. The group ID is also assigned to card IDs associated with the character IDs of all characters included in this group character. Furthermore, group character information for indicating whether or not an assigned character is a grouped character (group character) is associated with a card ID. It is indicated that the assigned character is not a group character when the group character information is 0, and that the assigned character is a group character when the group character information is 1.

For example, in Table 1, since character ID=15 is assigned to card IDs 1 and 5, it is possible to determine that different versions of the same character are assigned to card IDs 1 and 5. Furthermore, although different character IDs 15 and 5 are assigned to card IDs 1 and 3, the same group ID=12 is assigned to card IDs 1 and 3. This indicates that although the characters assigned to the card IDs are different, these characters are characters included in the group character to which group ID=12 has been assigned. It is indicated that card ID=6 has group character information=1, and thus character ID=23 associated with this card ID is a group character. In addition, since the group ID of character ID=23 is 12, it is indicated that character IDs=5 and 15 to which the same group ID has been assigned are grouped characters.

Alternatively, group character information and a group ID need not necessarily be associated with a grouped character, and the character IDs of all characters included in the grouped character may be associated with card IDs.

Figure 5:
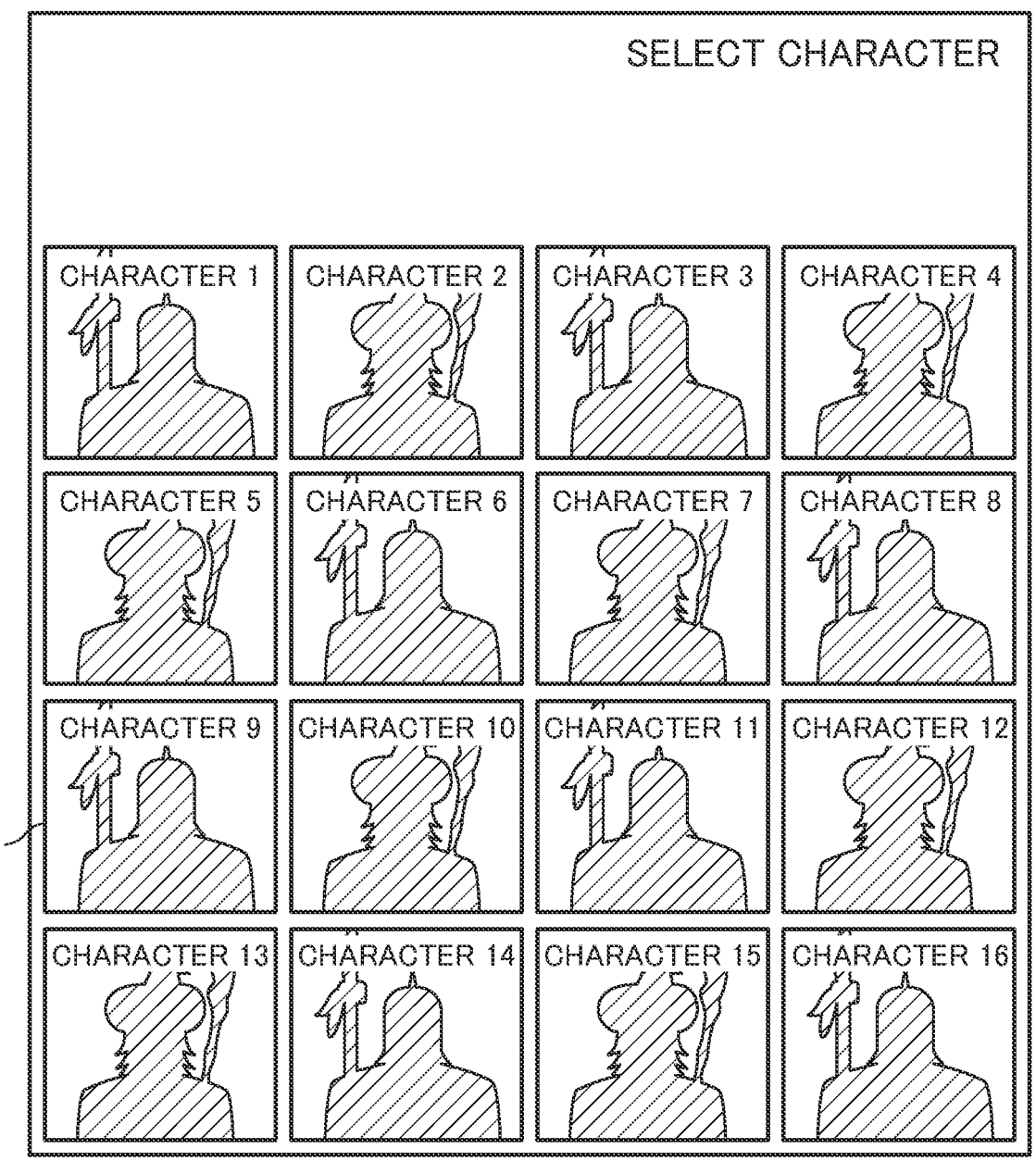
FIG. 5 is an example of the game screen according to the embodiment of the present invention.

In this embodiment, it is assumed that, in addition to a card 51 associated with a main character, cards 52-56 associated with five characters A to E can be set. By touching a touchscreen on which images indicating the individual cards are displayed, a card selection screen 60 (FIG. 5) for changing the cards to other cards is displayed. In the card selection screen 60, a plurality of cards 61 that can be used by the user are presented. By the user selecting cards, it is possible to change cards to be included in a game medium set.

In this embodiment, although it is assumed that game media are cards with which characters have been associated, things used in the game, such as game items or weapons, may be associated with the cards, or characters or items themselves may serve as the game media.

Figure 6:
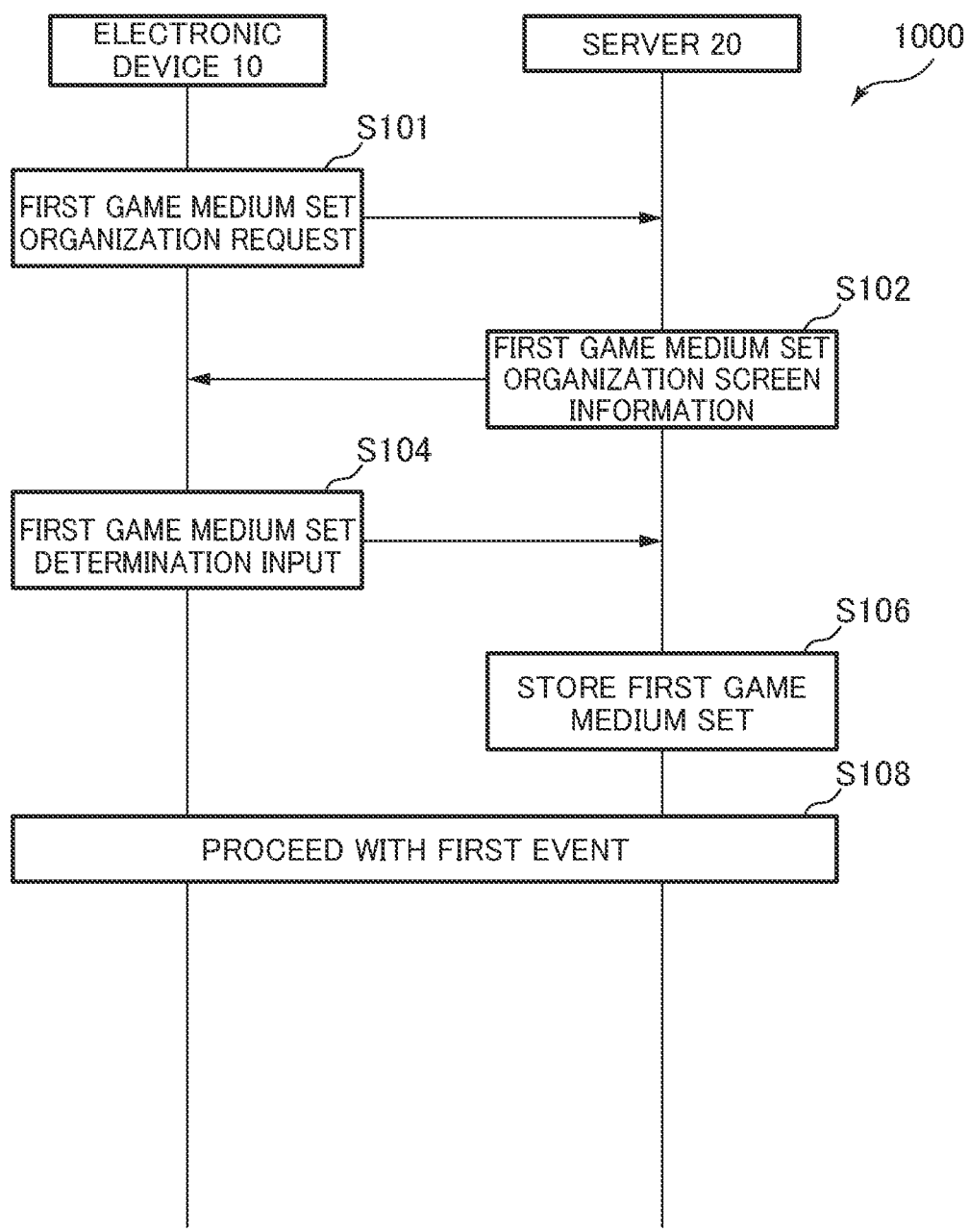
FIG. 6 is a flowchart showing information processing according to the embodiment of the present invention.

Next, information processing executed by the game system 1 according to the embodiment of the present invention will be described by using the flowcharts shown in FIGS. 6 and 7. The game system in this embodiment is a system for a game in which first and second events proceed by using a game medium set organized to include two or more game media selected from among a plurality of game media that can be used by a user. Here, although the first event is such that a battle with a monster is performed by using a game medium set organized in accordance with a first organization rule and the second event is such that a battle with a monster is performed by using a game medium set organized in accordance with a second organization rule, events may be any events as long as they are executed in a game by using game medium sets.

In this embodiment, in order to describe applying a first game medium set organized for the first event to a second game medium set for the second event, an aspect in which the second event is executed after executing the first event will be described, but the game system may be such that the second event can be executed first. The game may proceed in any way as long as it is possible to use the first game medium set organized for the first event as the second game medium set for the second event.

First, processing 1000 for executing the first event will be described on the basis of FIG. 6. When a user who executes the first event performs an input for requesting the execution of the first event on a smartphone serving as the electronic device 10, game screen information for the first event is provided from the server 20. This game screen includes a button for requesting the organization of a first game medium set, and by touching this button, a first game medium set organization request is transmitted from the electronic device 10 to the server 20 (S101). In response to this request, the server 20 generates first game medium set organization screen information and transmits the information to the electronic device 10 (S102). On the basis of this information, the electronic device 10 displays a first game medium set organization screen. Here, it is assumed that the first game medium set organization screen is similar to that in FIG. 4. By using this screen, the user organizes the first game medium set and transmits a determination input to the server 20 (S104).

It is assumed that the first organization rule for the first event is such that two or more cards associated with the same character ID must not be included in a single first game medium set. For example, in the first game medium set organization screen, on the basis of the card information as shown in Table 1, by not allowing the selection of cards associated with the same character ID as a character ID associated with a card ID already organized into the game medium set, it is possible to allow the user to organize the first game medium set following the first organization rule.

When the server 20 receives a first game medium set determination input, the server 20 stores the organized first game medium set in the game control unit 44. In this embodiment, the user can store a plurality of first game medium sets in the server 20 by individually associating them with a plurality of first game medium set IDs. For example, the first game medium set determination input includes information in which the first game medium set IDs are associated with card IDs. The server 20 manages the first game medium sets by storing the table shown in Table 2.

TABLE 2

| First game medium set ID | Card ID | | | | |
| --- | --- | --- | --- | --- | --- |
| | Card 1 | Card 2 | Card 3 | Card 4 | Card 5 |
| 1 | 15 | 12 | 3 | 5 | 7 |
| 2 | 3 | 6 | 9 | 43 | 23 |
| 3 | 9 | 11 | 21 | 34 | — |
| 4 | 29 | 31 | 89 | 87 | 102 |
| 5 | 34 | 88 | 44 | — | — |
| ... | ... | ... | ... | ... | ... |

As shown in Table 2, information for managing the first game medium sets is stored such that zero to five card IDs are associated with each of the first game medium set IDs.

Five card IDs do not necessarily need to be associated with each game medium set. In the case where no card IDs are associated, an event may proceed with only a main character. Furthermore, on the basis of Table 1, character IDs, etc. associated with individual card IDs may also be included in Table 2.

When a first game medium set is stored, the user can proceed with the first event by performing a request for proceeding with the first event (S108). In the case where a plurality of first game medium sets are stored, a single set to be used for the event to proceed is selected. The first event in this embodiment is such that a battle against a monster is performed by using characters associated with card IDs included in the first game medium set. When the server 20 receives the request for proceeding with the first event, the server 20 generates screen information for the battle with the monster, the game control unit 44 of the server 20 executes processing for calculating the fighting power, damage, etc. of the characters and the monster on the basis of a user input via the electronic device 10, and additional game screen information is generated and transmitted to the electronic device 10. When the battle is terminated after repeatedly executing these processing steps, the proceeding of the first event is terminated.

In this embodiment, the case where a request for organizing first game medium sets is performed has been described, but in the case where the organization of the first game medium sets has already been finished, only the proceeding of the first event can be performed by using the organized first game medium sets without executing the processing for organizing the first game medium sets again.

Next, processing 2000 for performing the second event will be described on the basis of FIG. 7. When the user performs an input for requesting the execution of the second event on a smartphone serving as the electronic device 10 after the first event is terminated, game screen information for the second event is provided from the server 20. An example game screen 70 is shown in FIG. 8.

The second event in this embodiment is such that a battle against a monster is performed, and performing the battle a plurality of times is required. A second game medium set is organized for each battle. In the second event, second game medium sets following the second organization rule need to be used. Similarly to the first organization rule, the second organization rule is that two or more cards associated with the same character ID cannot be organized into a single game medium set, and that a character used in another second game medium set, except for the main character, cannot be used. For example, a card associated with the same character ID as a character ID included in a second game medium set 1 used in a first battle cannot be incorporated into a second game medium set 2 to be used in a second battle.

Figure 8:
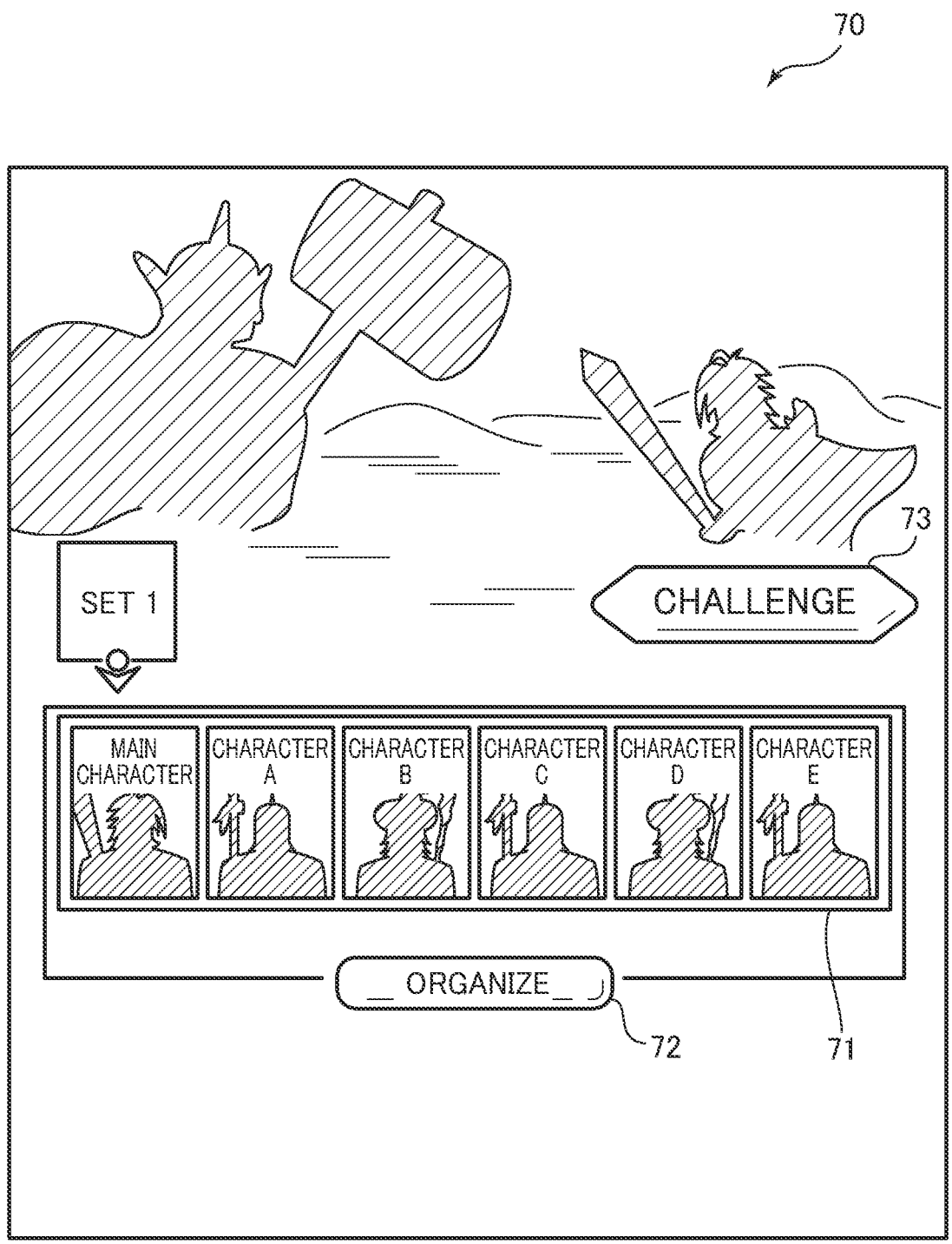
FIG. 8 is an example of the game screen according to the embodiment of the present invention.

In FIG. 8, the second game medium set 1 to be used in the first battle is displayed. Here, a first game medium set used in the first event can be applied and used by copying it to the second game medium set 1. Since other second game medium sets have not been organized in the first battle, the first game medium set can be used directly. It is also possible to change cards to be included in this game medium set by touching an organization button 72. Similarly to the first game medium sets, the second game medium sets can also be managed by IDs. As shown in Table 3, the second game medium sets can be managed by associating card IDs with second game medium set IDs and storing the card IDs and the second game medium set IDs in the game control unit 44.

TABLE 3

| Second game medium set ID | Card ID | | | | |
| --- | --- | --- | --- | --- | --- |
| | Card 1 | Card 2 | Card 3 | Card 4 | Card 5 |
| 1 | 15 | 12 | 3 | 5 | 7 |
| 2 | 19 | 6 | 9 | 43 | 23 |
| ... | ... | ... | ... | ... | ... |

As a modification, regarding the second game medium set 1 to be used in the first battle, characters other than the main character may be blank such that no card IDs are associated with these characters. In the case where it is not required by a specification to use the main character, the main character need not be associated.

Figure 9:
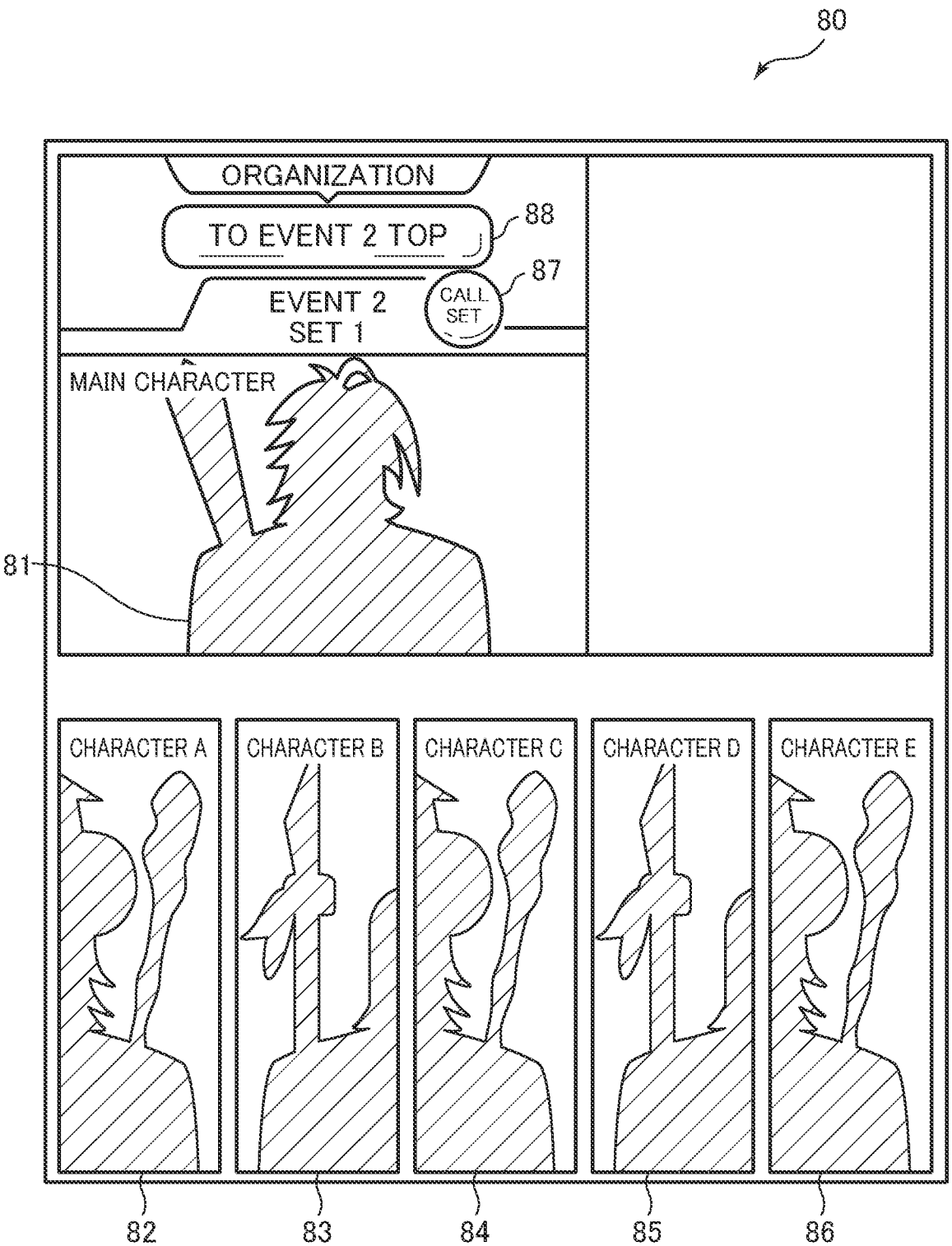
FIG. 9 is an example of the game screen according to the embodiment of the present invention.

By touching the organization button 72, a request for organizing a second game medium set is input (S201), and second game medium set organization screen information is transmitted from the server 20 (S202). At the electronic device 10, for example, a second game medium set organization screen 80 shown in FIG. 9 is displayed. Similarly to the first game medium set organization screen 50, this organization screen 80 is configured such that five cards 82-86 associated with a main character 81 and other characters A-E can be organized.

Furthermore, the second game medium set organization screen 80 includes a set call button 87. By touching this button, an application request for applying a first game medium set is input (S204), and first game medium set selection information is transmitted to the server 20 (S206). The first game medium set selection information is information indicating a first game medium set selected to be applied to a second game medium set. Here, it is assumed that information in which selected game media are, from among a plurality of first game medium sets, a game medium set used by the user in the first event is transmitted as an initial value. For example, a selected first game medium set ID is transmitted. As a modification, the user may be allowed to select a first game medium set serving as an initial value, and a single first game medium set selected at the server 20 as an initial value may be set instead of transmitting an initial value from the electronic device 10.

In response to this, the server 20 executes processing for determining whether or not the first game medium set selected to be used as a second game medium set follows the second organization rule (S208). In the case where it is determined that the first game medium set does not follow the second organization rule, i.e., the first game medium set is non-conforming, as processing for conforming to the second organization rule, the conformance unit 49 generates non-conforming presentation information for indicating cards, in the first game medium set selected to be used as a second game medium set, that have been determined as not following the second organization rule (S210). In the case where it is determined that the first game medium set follows the second organization rule, processing for generating set selection screen information for indicating the selected first game medium set and displaying a screen including a button that allows the selection of other game medium sets is executed, and the generated information is transmitted to the electronic device 10 (S212). In the processing for generating set selection screen information, in the case where non-conforming presentation information has been generated in S210, it is possible to include the non-conforming presentation information in the set selection screen information or update the set selection screen information on the basis of the non-conforming presentation information.

In this embodiment, the determination unit 48 included in the second game medium set organization unit 46 determines whether or not character IDs associated with card IDs included in the selected first game medium set are included in other second game medium sets. In this embodiment, in the first battle, since other second game media have not been set, it is not determined that the second organization rule is not followed.

Figure 10:
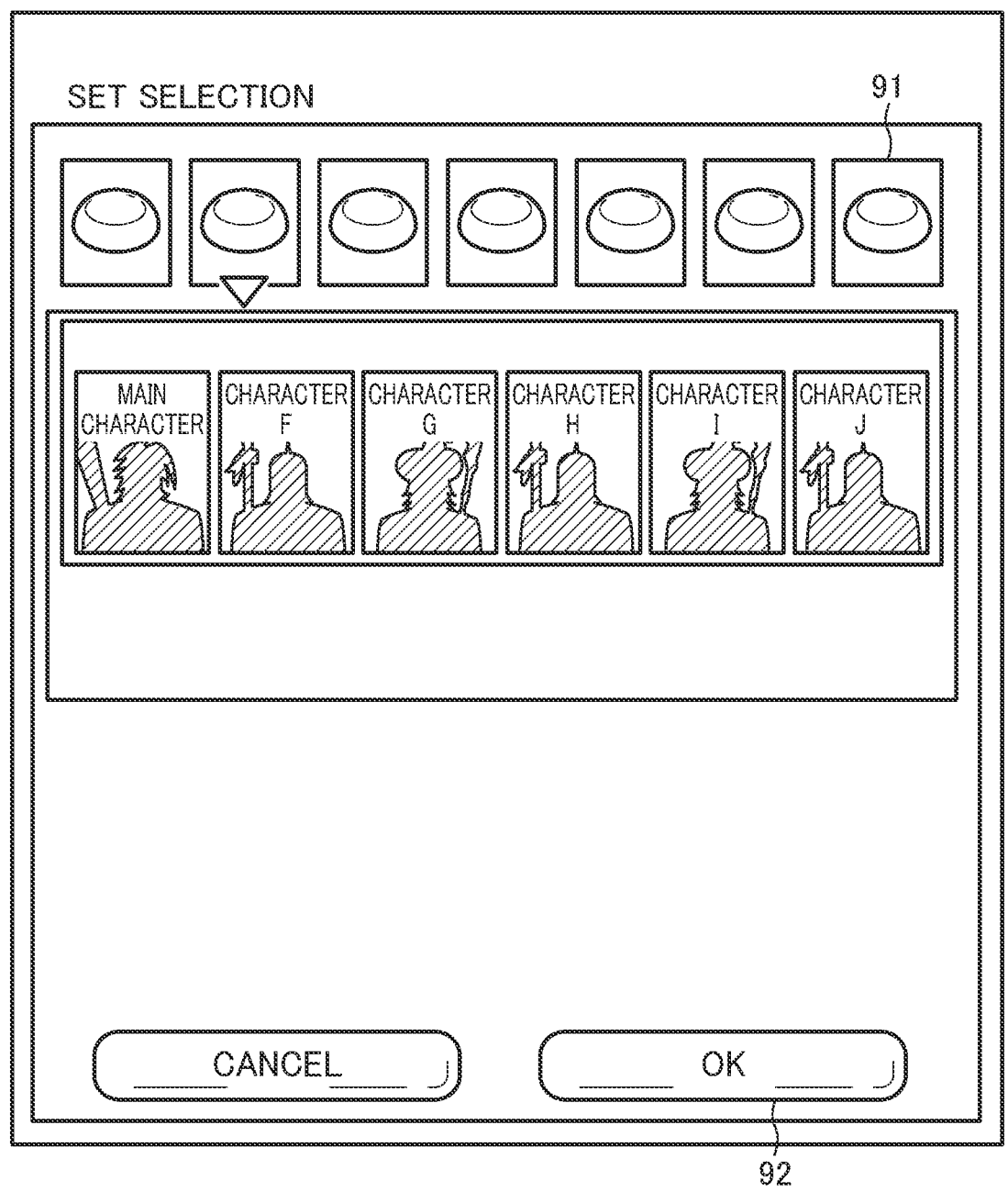
FIG. 10 is an example of the game screen according to the embodiment of the present invention.

At the electronic device 10, for example, a set selection screen 90 shown in FIG. 10 is displayed. Furthermore, when the change of a selected set is requested (S214) by the user touching a set selection button 91, the selection of a new first game medium set by the user is accepted, and the processing for determining the conformance to the second organization rule, etc. with respect to the newly selected first game medium set is executed as in the processing described above (S206-S212). In this embodiment, one of a plurality of first game medium sets is associated with each of a plurality of set selection buttons, and by touching each button, it is possible to select a first game medium set associated with the button.

By touching an "OK" button 92 in the set selection screen 90, a request for determining that the selected first game medium set is to be used as a second game medium set is performed (S216). When the determination request is not performed, the electronic device 10 waits until another selection change request or determination request is performed (S214-S216). In the case where the determination request is performed, the electronic device 10 transmits the determination request to the server 20 (S218).

At the server 20, the first game medium set selected when the determination request has been performed is stored as a second game medium set (S220). Then, it is determined whether or not the stored second game medium set conforms to the second organization rule (S222). Here, the result of determination already performed in S208 may be stored in the game control unit 44 and used. In the case where it is determined that the second game medium set does not conform to the second organization rule, deletion proposal information for proposing the deletion of the cards determined to be non-conforming from the game medium set is transmitted to the electronic device 10 (S224).

At the electronic device 10, the deletion proposal information is presented to the user, and it is determined whether or not a deletion instruction is input by the user in response to the deletion proposal information (S226). In the case where the deletion instruction is input, a deletion request including card IDs to be deleted is transmitted to the server 20 (S228), and at the server 20, the card IDs are deleted from the second game medium set stored in the game control unit 44 (S230). In the case where the deletion instruction is not input, since said game medium set cannot be used in the second event, the processing returns to the step of waiting for the selection change request, the determination request, and the deletion instruction with respect to the first game medium set (S214, S216, and S224).

After the second game medium set is determined, the game screen 70 is displayed again, and the player starts the first battle of the second event by touching a "Challenge" button, and the player proceeds with the second event by using the determined second game medium set (S232). Before starting the battle, it is possible to organize cards that can be used instead of the deleted cards, or allow to change the organized cards to other cards.

When a "Challenge" button 73 is touched in the game screen 70, a request for proceeding with the second event is transmitted to the server 20, and the proceeding with the second event is started. When the proceeding with the second event is started, the server 20 generates screen information for a battle with a monster, the game control unit 44 of the server 20 executes processing for calculating the fighting power, damage, etc. of the characters and the monster on the basis of a user input via the electronic device 10, and further game screen information is generated and transmitted to the electronic device 10. When the battle is terminated after repeatedly executing these processing steps, the proceeding with the second event is terminated.

Figure 11:
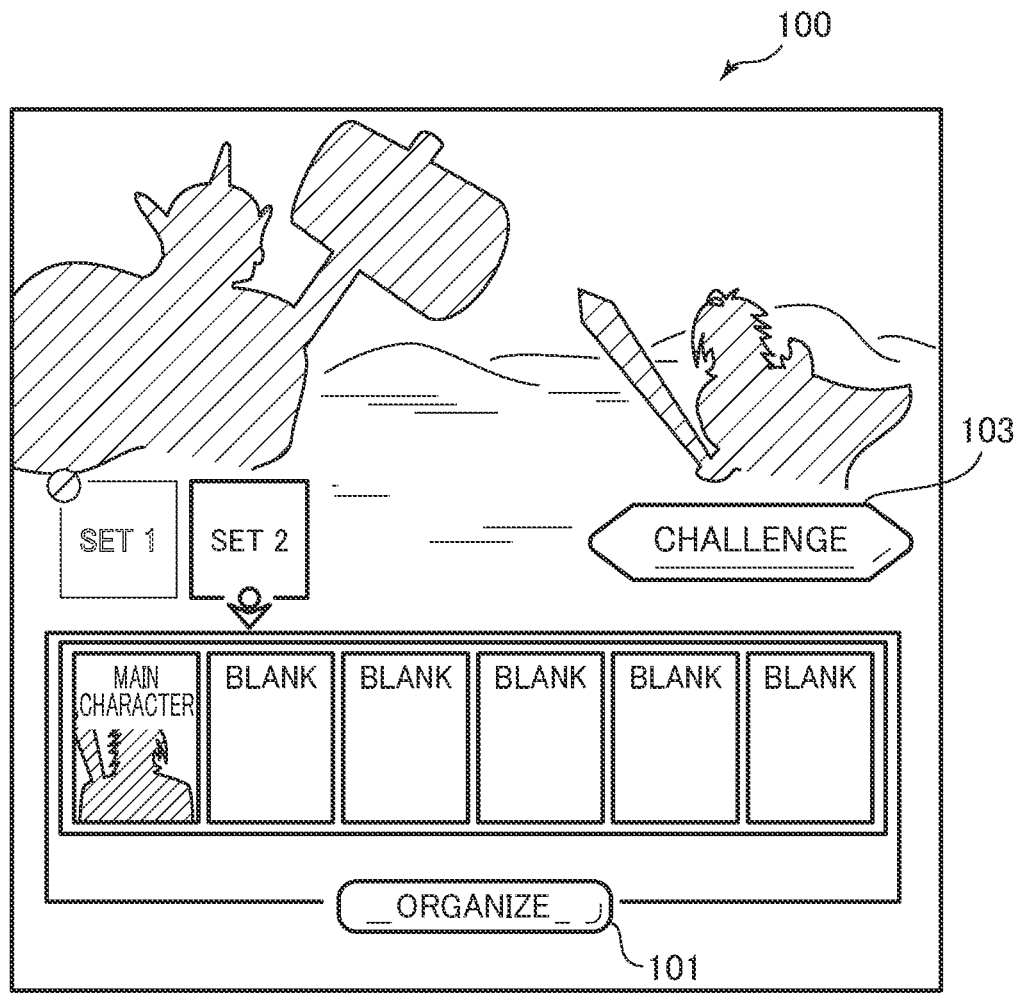
FIG. 11 is an example of the game screen according to the embodiment of the present invention.

In this embodiment, it is assumed that the second event includes a battle against a monster that is to be performed for a prescribed number of times. Thus, when the first battle of the second event is terminated, the screen is transitioned to a game screen 100 in FIG. 11. In the second game medium set 2 to be used in the second battle, it is not possible to use characters included in the second game medium set 1 used in the first battle except for the main character. Thus, a set of characters except for the main character are blank. It is possible for the user to touch an organization button 102 to input a request for organizing the second game medium set (S201), thereby calling the second game medium set organization screen 80 shown in FIG. 9, and to touch the set call button 87 to execute the processing for applying a first game medium set again, thereby proceeding with the second event (S201-S232).

The processing for applying a first game medium set to the second game medium set 2 is similar to the above-described processing for applying a first game medium set to the second game medium set 1 to be used for the first battle. However, since other second game medium sets have not been set when setting the second game medium set 1, there are no cases where it is determined that the second game medium set 1 does not follow the second organization rule because of inclusion in other second game medium sets. Since the second game medium set 1 has already been stored when organizing the second game medium set 2, it is determined that the second game medium set 2 does not follow the second organization rule when the characters included in the second game medium set 1 are included in the second game medium set 2. Since the processing for applying a first game medium set to the second game medium set 2 is basically the same as the processing with respect to the second game medium set 1, differences between these two kinds of processing will be described in detail.

The determination unit 48 determines whether or not characters included in the second game medium set 2 is included in the second game medium set 1 (S208). For example, character IDs associated with card IDs included in the second game medium set 2 are compared with character IDs associated with character IDs included in the second game medium set 1, and it is determined whether or not the same character IDs exist.

As a modification, the second organization rule can be such that: card IDs associated with a single character ID can be organized into only one of all second game medium sets; and in the case where a card ID the group character information of which is 1 and thus indicating that the card is associated with a group character is included in any of the second game medium sets, card IDs associated with the same group ID as a group ID associated with said card ID can be organized into only one of all the second game medium sets. In this case, the determination unit 48 compares character IDs included in the second game medium sets 1 and 2, determines whether or not the group character information of each card ID is 1, and compares group IDs in the case where a card the group character information of which is 1 is included. For example, since card ID=6 shown in Table 1 has group character information=1, in the case where any of second game medium sets includes this card, it is determined that card IDs=1, 3, and 5 associated with group ID=12 do not conform to the second organization rule.

Figure 12:
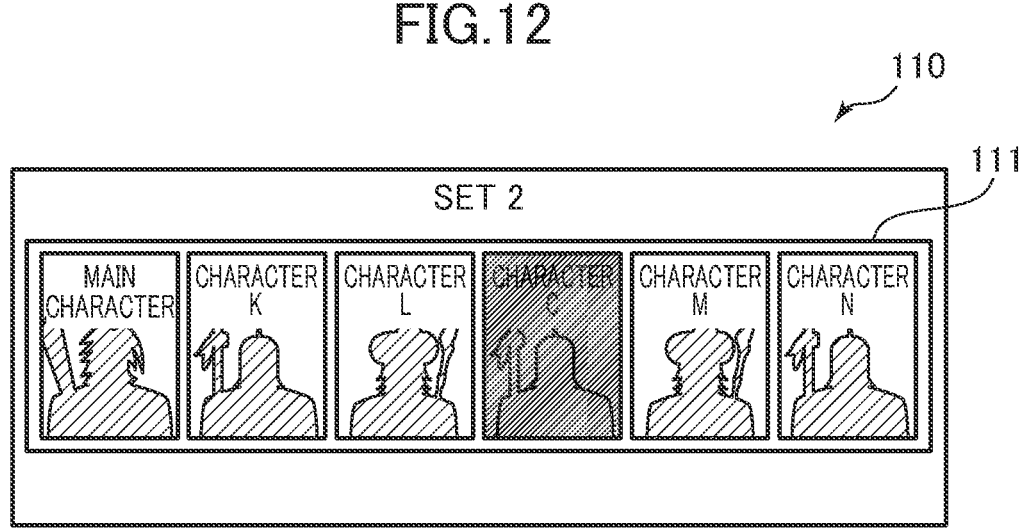
FIG. 12 is an example of the game screen according to the embodiment of the present invention.

In this embodiment, since character C included in the first game medium set selected to be used as a second game medium set is also included in the second game medium set 1, it is determined that the second game medium set does not follow the second organization rule (S208). In this case, as conformance processing for conforming to the second organization rule, the conformance unit 49 generates non-conforming presentation information for indicating a card determined as not following the second organization rule (S210). Here, as shown in FIG. 12, information for gray-out display is generated to indicate that character C in the first game medium set selected to be used as the second game medium set 2 cannot be used. For example, processing for replacing character C with a gray-out image is executed. This makes it possible to prompt a player to change the unavailable character to another available character.

Figure 13:
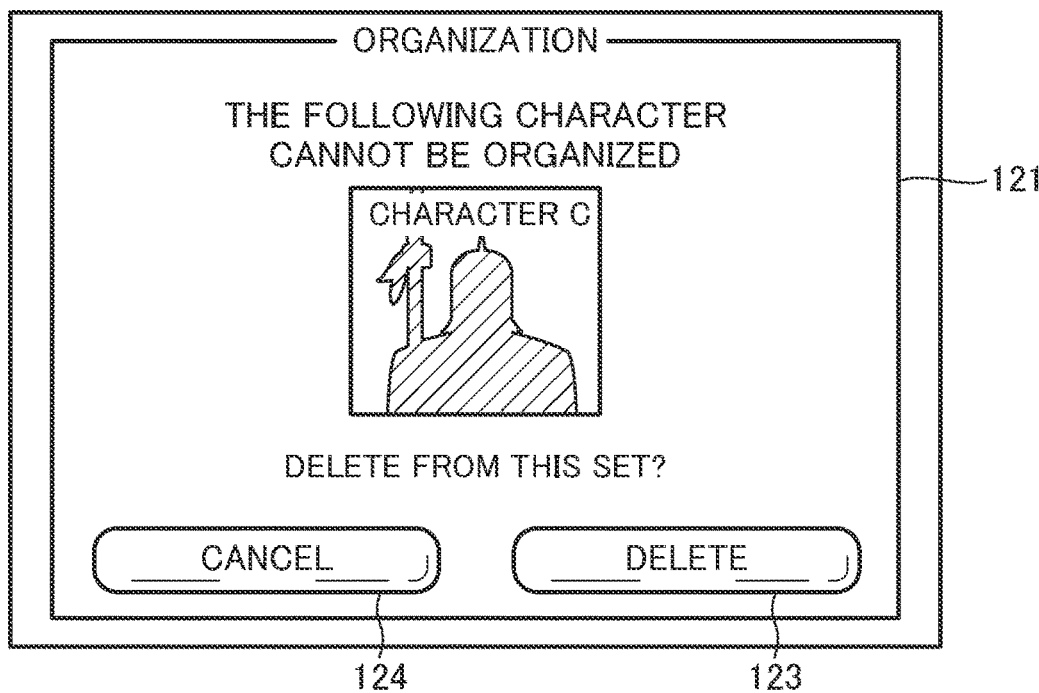
FIG. 13 is an example of the game screen according to the embodiment of the present invention.

Furthermore, in the case where the user performs a request for determining to use a first game medium set including a non-conforming character as a second game medium set, deletion proposal information for proposing the deletion of a card determined as non-conforming from a game medium set is transmitted to the electronic device 10 (S224). For example, as in a game screen 120 shown in FIG. 13, information indicating an unavailable character is provided (121), and a button 123 for excluding said character from a game medium set is displayed. In the case where the user touches the button, the character is excluded from the second game medium set 2 (S230). Meanwhile, in the case where a cancel button 124 is touched, it is assumed that there has been no deletion instruction, and the processing returns to the step of waiting for the selection change request, the determination request, or the deletion instruction (S214, S216, and S226).

The user can proceed with the second battle by using the determined second game medium set 2. Also in a third battle and thereafter, by means of similar processing, without including an already-used character in a game medium set, the second game medium set organization processing is repeatedly executed for the event to proceed until a prescribed number of battles are terminated. Due to this feature, since players have to use a plurality of characters, players are not satisfied with growing only a specific character and are encouraged to grow many characters, thereby enhancing the fun of a game.

As a modification, in the third battle and thereafter, using a second game medium set used in the first battle and the second battle may be accepted. This makes it possible even for a user not having sufficient number of characters to fully enjoy the second event. In this case, the characters used in the first battle and the second battle may perform the third battle by taking over parameters such as hit points decreased in the first battle and the second battle.

Figure 14:
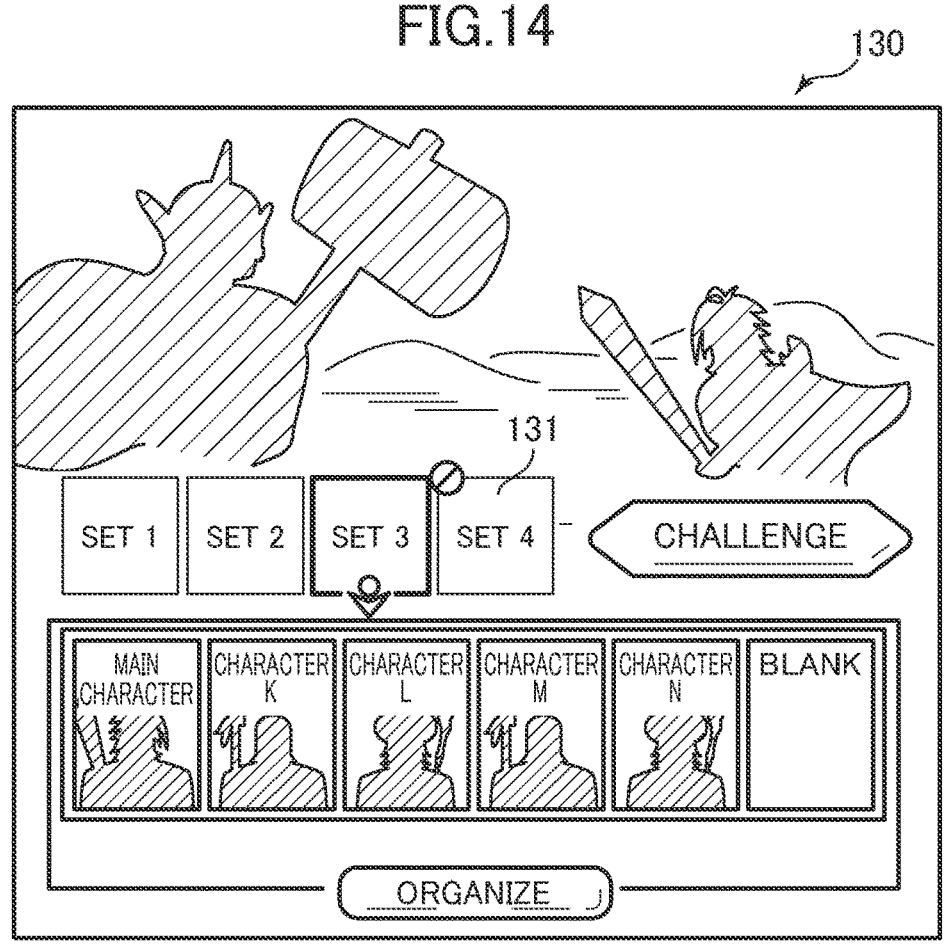
FIG. 14 is an example of the game screen according to the embodiment of the present invention.

As a further modification, a plurality of second game medium sets may be set before setting the first battle of the second event. For example, as shown in a game screen 130 in FIG. 14, a plurality of organization buttons 1-4 (131) are displayed before performing the first battle of the second event, second game medium sets 1-4 are associated with the individual buttons, and it is possible to execute the organization processing (S201-S230) for organizing each of the second game medium sets by touching each button.

Figure 7:
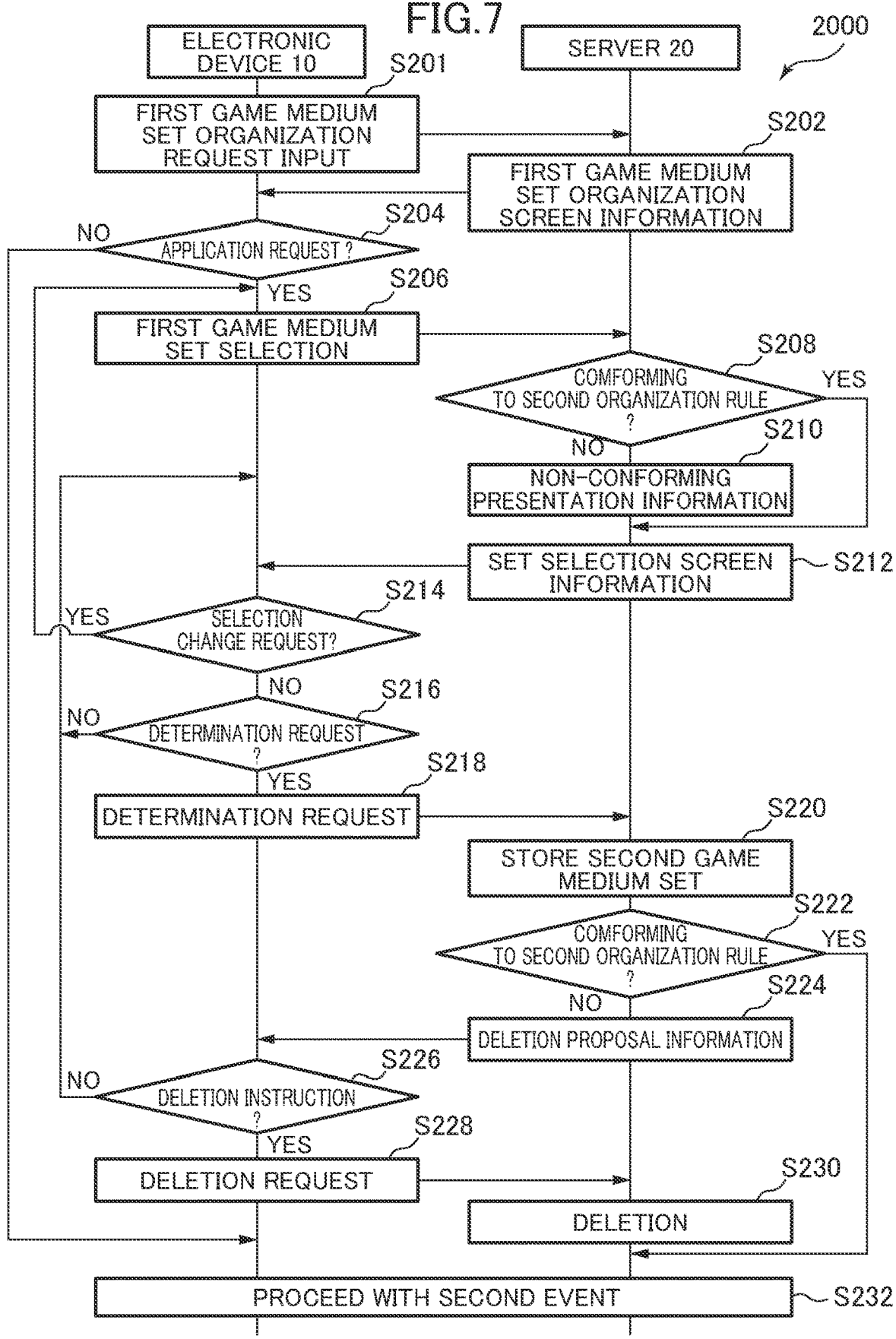
FIG. 7 is a flowchart showing information processing according to the embodiment of the present invention.
Figure 15:
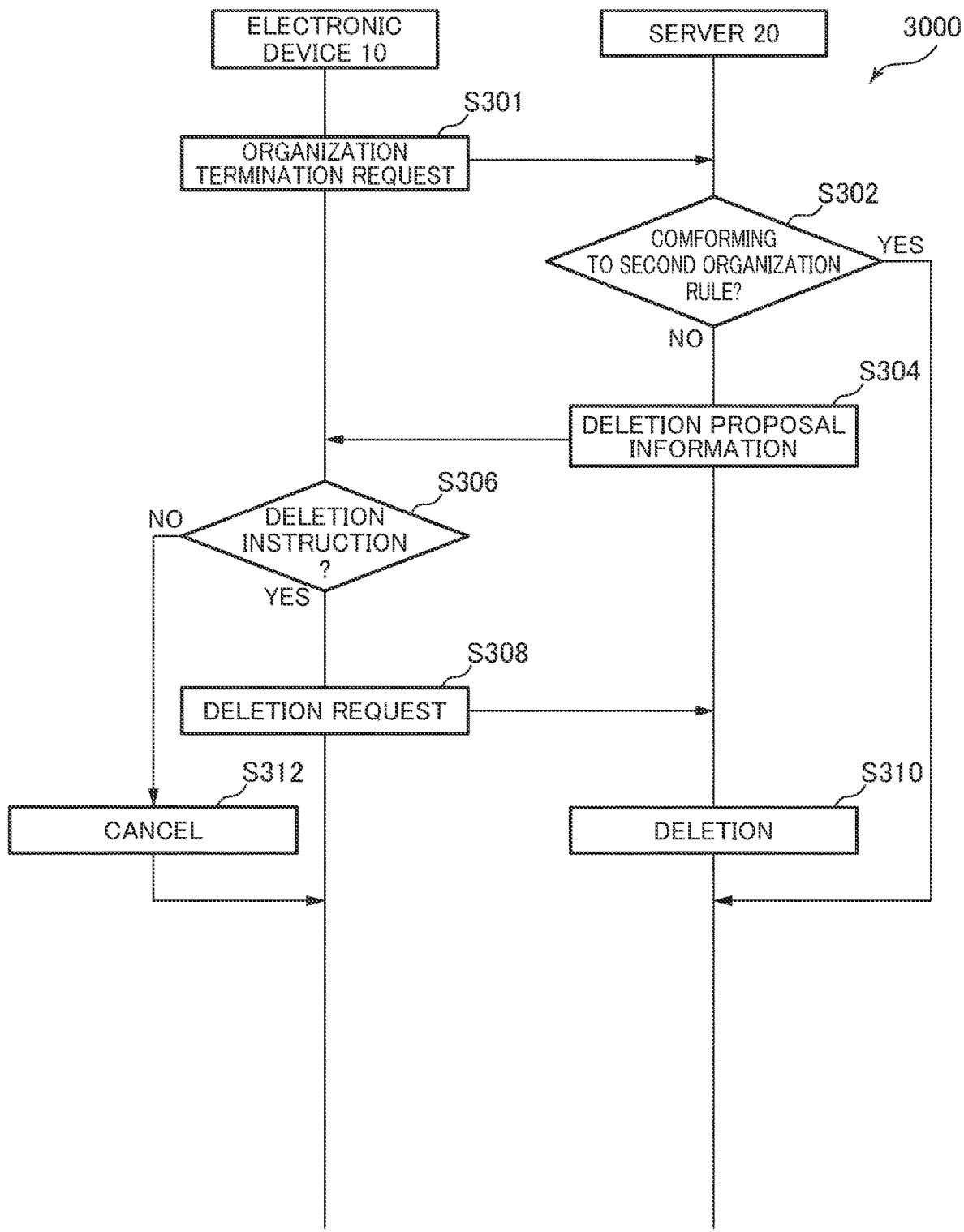
FIG. 15 is a flowchart showing information processing according to the embodiment of the present invention.

As a modification, in the processing for applying a first game medium set to a second game medium set, shown in FIG. 7, in the case where a deletion instruction is not performed (S226), after returning to the game screen 80 in FIG. 9, conformance determination may be performed again when an organization termination request is performed (FIG. 15). For example, after returning to the organization screen shown in FIG. 9, it may be allowed to change the card of a character that the user wishes to change by touching the card to call the card selection screen 60 in FIG. 5. Then, in the game screen 80, when a "to event TOP" button 88 is touched to terminate the organization, an organization termination request is transmitted to the server 20 (S301), the second organization rule conformance determination (S302) is performed again, and deletion proposal information is transmitted to the electronic device 10 (S304) in the case of non-conformance. When a deletion instruction is performed by the user (S306), a deletion request is transmitted to the server 20, and a non-conforming card is deleted from a second game medium set (S310). The processing of S302-S310 is similar to that of S222-S230. In the case where the user does not perform a deletion instruction (S306) when the deletion proposal information is presented, for example, when a "cancel" button is touched, the organization termination request is canceled (S312), and it is possible to return to the game screen 80 for organization. This makes it possible to register a first game medium set including cards not conforming to a second game medium set as a tentative second game medium set and individually change the non-conforming cards.

Such modification can also be used in the case where a second game medium set to which a first game medium set has been applied conforms to the second organization rule. That is, after applying a first game medium set to a second game medium set by means of the processing shown in FIG. 7 (S201-S230), before proceeding with the second event (S232), it may be allowed to change the card of a character (82-86) that the user wishes to change by touching the card to call the card selection screen 60 in FIG. 5 after returning to the organization screen 80 shown in FIG. 9. This makes it possible to use a first game medium set as a basic configuration while selecting another card instead of the deleted non-conforming card or easily performing modification in accordance with the second event.

In the embodiment described above, the case where a user plays a game by using a browser program at the electronic device 10 has been described as an example, but at the electronic device 10, information processing for proceeding with a game may be executed by storing a game program in the storage device 14 and executing the game program. The game program includes a game program for executing a game and various kinds of data to be referred to when the game program is executed. The game program is started in accordance with a user operation on the electronic device 10, and is executed on an operating system (OS) implemented in the electronic device 10 in advance. In this case, in the embodiment described above, it is possible for the game control unit 34 of the electronic device 10 to be provided with at least some of the functions provided by the game control unit 44 of the server 20.

Figure 16:
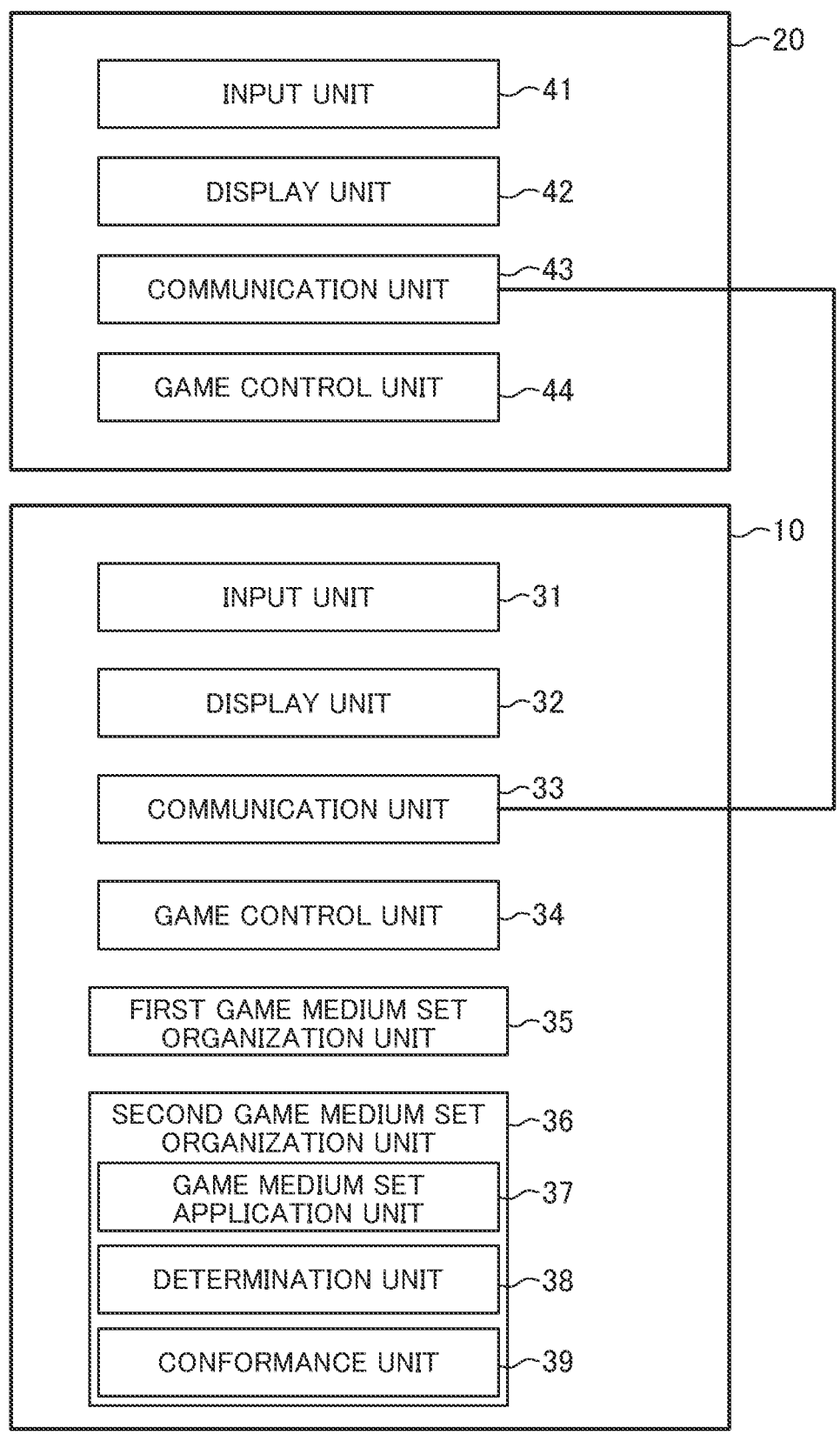
FIG. 16 is a function block diagram of the electronic device according to the embodiment of the present invention.

In yet another embodiment, as shown in FIG. 16, instead of the first game medium set organization unit 45 and the second game medium set organization unit 46 of the server 20, it is possible for the electronic device 10 to be provided with a first game medium set organization unit 35 and a second game medium set organization unit 36. Furthermore, it may be allowed to execute a game with only a single electronic device 10 while the electronic device 10 does not communicate with the server 20.

The processing or operation described above may be modified freely as long as no inconsistency arises in the processing or operation, such as an inconsistency that a certain step utilizes data that may not yet be available in that step. Furthermore, the examples described above are examples for explaining the present invention, and the present invention is not limited to those examples. The present invention can be embodied in various forms as long as there is no departure from the gist thereof.

REFERENCE SIGNS LIST

1 Game system
10 Electronic device
11 Processor
12 Display device
13 Input device
14 Storage device
15 Communication device
16 Bus
20 Server
21 Processor
22 Display device
23 Input device
24 Storage device
25 Communication device
26 Bus
31 Input unit
32 Display unit
33 Communication unit
34 Game control unit
35 First game medium set organization unit
36 Second game medium set organization unit
41 Input unit
42 Display unit
43 Communication unit
44 Game control unit
45 First game medium set organization unit
46 Second game medium set organization unit
47 Game medium set application unit
48 Determination unit
49 Conformance unit

The invention claimed is:

1. A system comprising:
a first game medium set organization unit that organizes, based on a first user input to a touchscreen on a first electronic device, a first game medium set for a first event in an electronic game in accordance with a first organization rule; and
a second game medium set organization unit that organizes, based on a second user input to the touchscreen, a second game medium set for a second event in the electronic game in accordance with a second organization rule,
wherein the first event and the second event are implemented in the electronic game from two or more game media selected from among a plurality of game media and using a plurality of game screens that are presented on a display device of the first electronic device,
wherein the electronic game is performed by a network comprising a server and a plurality of electronic devices that comprise the first electronic device,
wherein the first organization rule is different from the second organization rule,
wherein the second game medium set organization unit comprises:
a game medium set application unit that applies the first game medium set that is organized on a card organization screen in the electronic game that is presented on the display device in accordance with the first organization rule to the second game medium set,
wherein the first game medium set is organized by the first game medium set organization unit, based on a third user input to the touchscreen,
a determination unit that determines whether the second game medium set or the first game medium set to be applied to the second game medium set follows the second organization rule,
a conformance unit that, in response to determining that the second organization rule is not followed, conforms, to the second organization rule, the second game medium set or the first game medium set to be applied to the second game medium set,
wherein the first game medium set organization unit organizes a first plurality of game medium sets comprising the first game medium set,
wherein the second game medium set organization unit organizes a second plurality of game medium sets comprising the second game medium set, and
wherein the game medium set application unit applies a selected game medium set among the first plurality of game medium sets to at least one of the second plurality of game medium sets.

2. The system according to claim 1, wherein the conformance unit generates information for presenting a game medium not following the second organization rule among game media included in the second game medium set, or removes the game medium not following the second organization rule among the game media included in the second game medium set from the second game medium set.

3. The system according to claim 1, wherein the first game medium set to be applied to the second game medium set includes a first game medium set selected to be applied to the second organization rule.

4. The system according to claim 1, wherein:
the second event proceeds by using the second plurality of game medium sets;
the second game medium set organization unit organizes, in accordance with a user operation, the second plurality of game medium sets to be used for the second event to proceed; and
the determination unit compares a first plurality of identifiers associated with game media included in at least one of the second plurality of game medium sets with a second plurality of identifiers associated with game media included in the other game medium sets among the second plurality of game medium sets, and
in response to the first plurality of identifiers coinciding with the second plurality of identifiers, the determination unit determines that the at least one of the second plurality of game medium sets does not follow the second organization rule.

5. The system according to claim 4, wherein:
two or more kinds of identifiers are associated with a first plurality of game media;
the determination unit compares identifiers associated with a second plurality of game media included in the second plurality of game medium sets with identifiers associated with a third plurality of game media included in the other game medium sets among the second plurality of game medium sets, and in response to game media having any kinds of identifiers coinciding with each other, the determination unit determines that at least one of the second plurality of game medium sets does not follow the second organization rule.

6. The system according to claim 1, wherein:

the system includes a plurality of user terminals corresponding to the plurality of electronic devices;

the server includes the first game medium set organization unit and the second game medium set organization unit; and the plurality of user terminals accept a plurality of user inputs and transmit the plurality of user inputs to the server.

7. A method, performed by a computer, the method comprising:

a first game medium set organization step of organizing, based on a first user input to a touchscreen on a first electronic device, a first game medium set for a first event in an electronic game in accordance with a first organization rule; and a second game medium set organization step of organizing, based on a second user input to the touchscreen, a second game medium set for a second event in the electronic game in accordance with a second organization rule, wherein the first event and the second event are implemented in the electronic game from two or more game media selected from among a plurality of game media and using a plurality of game screens that are presented on a display device of the first electronic device, wherein the electronic game is performed by a network comprising a server and a plurality of electronic devices that comprise the first electronic device, wherein the first organization rule is different from the second organization rule, wherein the second game medium set organization step comprises:

a game medium set application step of applying the first game medium set that is organized on a card organization screen in the electronic game that is presented on the display device in accordance with the first organization rule to the second game medium set, wherein the first game medium set is organized by the first game medium set organization unit, based on a third user input to the touchscreen, a determination step of determining whether the second game medium set or the first game medium set to be applied to the second game medium set follows the second organization rule, and a conformance step of, in response to determining that the second organization rule is not followed, conforming, to the second organization rule, the second game medium set or the first game medium set to be applied to the second game medium set, wherein the first game medium set organization unit organizes a first plurality of game medium sets comprising the first game medium set, wherein the second game medium set organization unit organizes a second plurality of game medium sets comprising the second game medium set, and wherein the game medium set application unit applies a selected game medium set among the first plurality of game medium sets to at least one of the second plurality of game medium sets.

8. A non-transitory, computer readable medium storing a program, the program being configured to cause one or more computers to execute a method comprising:

a first game medium set organization step of organizing, based on a first user input to a touchscreen on a first electronic device, a first game medium set for a first event in an electronic game in accordance with a first organization rule; and a second game medium set organization step of organizing, based on a second user input to the touchscreen, a second game medium set for a second event in the electronic game in accordance with a second organization rule, wherein the first event and the second event are implemented in the electronic game from two or more game media selected from among a plurality of game media and using a plurality of game screens that are presented on a display device of the first electronic device, wherein the electronic game is performed by a network comprising a server and a plurality of electronic devices that comprise the first electronic device, wherein the first organization rule is different from the second organization rule, wherein the second game medium set organization step comprises:

a game medium set application step of applying the first game medium set that is organized on a card organization screen in the electronic game that is presented on the display device in accordance with the first organization rule to the second game medium set, wherein the first game medium set is organized by the first game medium set organization unit, based on a third user input to the touchscreen, a determination step of determining whether the second game medium set or the first game medium set to be applied to the second game medium set follows the second organization rule, and a conformance step of, in response to determining that the second organization rule is not followed, conforming, to the second organization rule, the second game medium set or the first game medium set to be applied to the second game medium set, wherein the first game medium set organization unit organizes a first plurality of game medium sets comprising the first game medium set, wherein the second game medium set organization unit organizes a second plurality of game medium sets comprising the second game medium set, and wherein the game medium set application unit applies a selected game medium set among the first plurality of game medium sets to at least one of the second plurality of game medium sets.

9. A server comprising:

a first game medium set organization unit that organizes, based on a first user input to a touchscreen on a first electronic device, a first game medium set for a first event in an electronic game in accordance with a first organization rule; and a second game medium set organization unit that organizes, based on a second user input to the touchscreen, a second game medium set for a second event in the electronic game in accordance with a second organization rule,
   wherein the first event and the second event are implemented in the electronic game from two or more game media selected from among a plurality of game media and using a plurality of game screens that are presented on a display device of the first electronic device,
   wherein the electronic game is performed by a network comprising the server and a plurality of electronic devices that comprise the first electronic device,
   wherein the first organization rule is different from the second organization rule,
wherein the second game medium set organization unit comprises:
a game medium set application unit that applies the first game medium set that is organized on a card organization screen in the electronic game that is presented on the display device in accordance with the first organization rule to the second game medium set,
   wherein the first game medium set is organized by the first game medium set organization unit, based on a third user input to the touchscreen,
a determination unit that determines whether the second game medium set or the first game medium set to be applied to the second game medium set follows the second organization rule, and
a conformance unit that, in response to determining that the second organization rule is not followed, conforms, to the second organization rule, the second game medium set or the first game medium set to be applied to the second game medium set,
   wherein the first game medium set organization unit organizes a first plurality of game medium sets comprising the first game medium set,
   wherein the second game medium set organization unit organizes a second plurality of game medium sets comprising the second game medium set, and
wherein the game medium set application unit applies a selected game medium set among the first plurality of game medium sets to at least one of the second plurality of game medium sets.

10. An electronic device comprising:
a first game medium set organization unit that organizes, based on a first user input to a touchscreen on the electronic device, a first game medium set for a first event in an electronic game in accordance with a first organization rule; and
a second game medium set organization unit that organizes, based on a second user input to the touchscreen, a second game medium set for a second event in the electronic game in accordance with a second organization rule,
   wherein the first event and the second event are implemented in the electronic game from two or more game media selected from among a plurality of game media and using a plurality of game screens that are presented on a display device of the first electronic device,
   wherein the electronic game is performed by a network comprising a server and a plurality of electronic devices that comprise the first electronic device,
   wherein the first organization rule is different from the second organization rule,
wherein the second game medium set organization unit comprises:
a game medium set application unit that applies the first game medium set that is organized on a card organization screen in the electronic game that is presented on the display device in accordance with the first organization rule to the second game medium set,
   wherein the first game medium set is organized by the first game medium set organization unit, based on a third user input to the touchscreen,
a determination unit that determines whether the second game medium set or the first game medium set to be applied to the second game medium set follows the second organization rule, and
a conformance unit that, in response to determining that the second organization rule is not followed, conforms, to the second organization rule, the second game medium set or the first game medium set to be applied to the second game medium set,
   wherein the first game medium set organization unit organizes a first plurality of game medium sets comprising the first game medium set,
   wherein the second game medium set organization unit organizes a second plurality of game medium sets comprising the second game medium set, and
wherein the game medium set application unit applies a selected game medium set among the first plurality of game medium sets to at least one of the second plurality of game medium sets.

* * * * *